US008624853B2

(12) United States Patent
Han et al.

(10) Patent No.: US 8,624,853 B2
(45) Date of Patent: *Jan. 7, 2014

(54) STRUCTURE-AUGMENTED TOUCH SENSING WITH FRUSTATED TOTAL INTERNAL REFLECTION

(75) Inventors: Jefferson Y. Han, Holliswood, NY (US); Joel S. Kollin, Seattle, WA (US); David Elliott Slobodin, Lake Oswego, OR (US)

(73) Assignee: Perceptive Pixel Inc., New York, NY (US)

( * ) Notice: Subject to any disclaimer, the term of this patent is extended or adjusted under 35 U.S.C. 154(b) by 658 days.

This patent is subject to a terminal disclaimer.

(21) Appl. No.: 12/757,693

(22) Filed: Apr. 9, 2010

(65) Prior Publication Data
US 2010/0302185 A1 Dec. 2, 2010

Related U.S. Application Data

(60) Provisional application No. 61/182,992, filed on Jun. 1, 2009.

(51) Int. Cl.
*G06F 3/041* (2006.01)
(52) U.S. Cl.
USPC .......................... 345/173; 345/175; 178/18.09
(58) Field of Classification Search
USPC ................................ 345/173, 175; 178/18.09
See application file for complete search history.

(56) References Cited

U.S. PATENT DOCUMENTS

| 3,200,701 | A | 8/1965 | Wyman |
| 3,673,327 | A | 6/1972 | Johnson et al. |
| 3,846,826 | A | 11/1974 | Mueller |

(Continued)

FOREIGN PATENT DOCUMENTS

| JP | 62-107325 | 5/1987 |
| JP | 8-50526 | 2/1996 |

(Continued)

OTHER PUBLICATIONS

Buxton, W., Hill, R., and Rowley P., "Issues and Techniques in Touch-Sensitive Tablet Input," Proceedings of the 12th Annual Conference on Computer Graphics and Interactive Techniques SIGGRAPH '85. ACM Press, New York, NY, 215-224 (1985).

(Continued)

*Primary Examiner* — Lun-Yi Lao
*Assistant Examiner* — Peter D McLoone
(74) *Attorney, Agent, or Firm* — Alleman Hall McCoy Russell & Tuttle LLP

(57) ABSTRACT

A touch-screen device includes a radiation source, a pliable waveguide configured to receive radiation emitted by the radiation source and to cause some of the received radiation to undergo total internal reflection within the pliable waveguide, a frustrating layer disposed relative to the pliable waveguide so as to enable the frustrating layer to contact the pliable waveguide when the pliable waveguide is physically deformed, the frustrating layer being configured to cause frustration of the total internal reflection of the received radiation within the pliable waveguide at a contact point between the frustrating layer and the pliable waveguide when the pliable waveguide is physically deformed to contact the frustrating layer such that some of the received radiation undergoing total internal reflection within the pliable waveguide escapes from the pliable waveguide at the contact point, and an imaging sensor configured to detect some of the radiation that escapes from the optical waveguide.

45 Claims, 13 Drawing Sheets

(56) References Cited

U.S. PATENT DOCUMENTS

| | | | |
|---|---|---|---|
| 4,134,063 A | | 1/1979 | Nicol et al. |
| 4,346,376 A | * | 8/1982 | Mallos .......................... 345/176 |
| 4,484,179 A | * | 11/1984 | Kasday ......................... 345/176 |
| 4,542,375 A | * | 9/1985 | Alles et al. .................... 345/176 |
| 4,668,861 A | | 5/1987 | White |
| 5,942,761 A | | 8/1999 | Tuli |
| 5,973,844 A | | 10/1999 | Burger |
| 6,323,846 B1 | | 11/2001 | Westerman et al. |
| 6,323,892 B1 | | 11/2001 | Mihara |
| 6,883,919 B2 | | 4/2005 | Travis |
| 6,895,164 B2 | | 5/2005 | Saccomanno |
| 6,972,753 B1 | | 12/2005 | Kimura et al. |
| 6,997,558 B2 | | 2/2006 | Perlin et al. |
| 7,302,152 B2 | | 11/2007 | Luther et al. |
| 7,330,629 B2 | | 2/2008 | Cooke et al. |
| 7,351,949 B2 | | 4/2008 | Oon et al. |
| 7,394,058 B2 | | 7/2008 | Chua et al. |
| 7,410,286 B2 | | 8/2008 | Travis |
| 7,412,119 B2 | | 8/2008 | Smits |
| 2003/0210537 A1 | | 11/2003 | Engelmann |
| 2004/0071417 A1 | | 4/2004 | Veligdan |
| 2005/0068537 A1 | | 3/2005 | Han et al. |
| 2005/0200293 A1 | | 9/2005 | Naugler et al. |
| 2006/0022956 A1 | | 2/2006 | Lengeling et al. |
| 2006/0026521 A1 | | 2/2006 | Hotelling et al. |
| 2006/0026535 A1 | | 2/2006 | Hotelling et al. |
| 2006/0026536 A1 | | 2/2006 | Hotelling et al. |
| 2006/0033724 A1 | | 2/2006 | Chaudhri et al. |
| 2006/0053387 A1 | | 3/2006 | Ording |
| 2006/0085757 A1 | | 4/2006 | Andre et al. |
| 2006/0086896 A1 | | 4/2006 | Han |
| 2006/0188196 A1 | | 8/2006 | Charters et al. |
| 2006/0227120 A1 | | 10/2006 | Eikman |
| 2006/0279558 A1 | * | 12/2006 | Van Delden et al. .......... 345/176 |
| 2007/0070050 A1 | | 3/2007 | Westerman et al. |
| 2007/0084989 A1 | * | 4/2007 | Lange et al. ................... 250/221 |
| 2007/0152985 A1 | * | 7/2007 | Ostergaard et al. ............ 345/176 |
| 2008/0007540 A1 | * | 1/2008 | Ostergaard ..................... 345/176 |
| 2008/0007542 A1 | * | 1/2008 | Eliasson et al. ................ 345/176 |
| 2008/0029691 A1 | * | 2/2008 | Han ................................ 250/224 |
| 2008/0150913 A1 | | 6/2008 | Bell et al. |
| 2008/0179507 A2 | | 7/2008 | Han |
| 2008/0192025 A1 | | 8/2008 | Jaeger et al. |
| 2008/0284925 A1 | | 11/2008 | Han |
| 2009/0033637 A1 | | 2/2009 | Han |
| 2009/0122020 A1 | * | 5/2009 | Eliasson et al. ................ 345/173 |
| 2009/0128499 A1 | * | 5/2009 | Izadi et al. ..................... 345/173 |
| 2010/0302196 A1 | * | 12/2010 | Han et al. ....................... 345/173 |
| 2010/0302210 A1 | * | 12/2010 | Han et al. ....................... 345/175 |

FOREIGN PATENT DOCUMENTS

| | | |
|---|---|---|
| JP | 10-162698 | 6/1998 |
| JP | 200494569 | 3/2004 |
| JP | 2006318512 | 11/2006 |
| WO | 0172037 | 9/2001 |
| WO | 02/45413 A1 | 6/2002 |
| WO | 2005/029395 A2 | 3/2005 |
| WO | 2005029172 | 3/2005 |
| WO | 2010141453 | 4/2005 |
| WO | 2006/044652 A1 | 4/2006 |
| WO | 2006/082444 A2 | 8/2006 |
| WO | 2007/003196 A2 | 1/2007 |
| WO | 2007/008766 A1 | 1/2007 |
| WO | 2008017077 | 2/2008 |
| WO | 2009018317 | 2/2009 |
| WO | 2009020940 | 2/2009 |
| WO | 2010141372 | 12/2010 |
| WO | 2010141380 | 12/2010 |

OTHER PUBLICATIONS

Han, Jefferson Y., "Low-Cost Multi-Touch Sensing Through Frustrated Total Internal Reflection," Media Research Laboratory, (New York University; Oct. 23-27, 2005; Seattle, Washington), 115-118.

Lee, S., Buxton, W. and Smith, K.C., "A Multi-Touch Three Dimensional Touch-Sensitive Tablet," Proceedings of the SIGCHI Conference on Human Factors in Computing Systems (San Francisco, CA, USA), CHI '85. ACM Press, New York, NY 21-25 (1955).

Malik, S and Laszio, J., "Visual Touchpad: A Two-Handed Gestural Input Device," Proceedings of the 6th International Conference on Multimodal Interfaces (State College, PA USA, Oct. 13-15, 2004), ICMI '04. ACM Press, New York, NY 289-296 (2004), 8 pgs.

Matsushita, N. and Rekimoto, J., "HoloWall: Designing a Finger, Hand, Body and Object Sensitive Wall," Proceedings of the 10th Annual ACM Symposium on User Interface Software and Technology (Banff, Alberta, Canada, Oct. 14-17, 1997), UIST '97. ACM Press, New York, NY 209-210 (1997).

Rekimoto, J., "SmartSkin: An Infrastructure for Freehand Manipulation on Interactive Surfaces," Proceedings of the SIGCHI Conference on Human Factors in Computing Systems, CHI '02. ACM Press, New York, NY 113-120 (2002), 8 pgs.

Westerman, W., Elias, J.G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, MN, Oct. 2001), 632-636 (2001).

Wilson, A.D., "TouchLight: An Imaging Touch Screen and Display for Gesture-Based Interaction," Proceedings of the 6th International Conference on Multimodal Interfaces (State College, PA USA, Oct. 13-15, 2004), ICMI '04. ACM Press, New York, NY (2004), 6 pgs.

Boual, Sophie; Large, Timothy; Buckingham, Mark; Travis, Adrian; Munford, Simon, "Wedge Displays as Cameras," 2006 Society for Information Display (SID) International Symposium Digest of technical Papers, pp. 1999-2002 (2006).

Non-final Office Action issued in U.S. Appl. No. 11/833,908, mailed Sep. 13, 2010, 49 pages.

Non-final Office Action issued in U.S. Appl. No. 12/185,782, mailed Jan. 12, 2011, 14 pages.

International Search Report dated Oct. 20, 2008 from WO08/017077, 3 pages.

International Search Report dated Feb. 19, 2009 from WO09/020940, 2 pages.

International Search Report dated Jan. 29, 2009 from WO09/018317, 2 pages.

Anonymous: "Anti-reflective coating", Wikipedia, Feb. 6, 2009, retrieved from the Internet: http://replay.waybackmachine.org/20090206235736//http://en.widipedia.org/wiki/Anti-reflective_coating (retrieved on Mar. 30, 2011), 6 pages.

Taira, Y., et al., "Low-Power LCD Using a Novel Optical System", 2002 SID International Symposium Digest of Technical Papers, Boston, MA, May 21-23, 2002, 3 pages.

International Search Report and Written Opinion dated Apr. 28, 2011 from WO10/141371,10 pages.

International Search Report and Written Opinion dated Mar. 1, 2011 from WO10/141308, 7 pages.

International Search Report and Written Opinion dated Apr. 28, 2011 from WO10/141453, 8 pages.

* cited by examiner

STRUCTURE-AUGMENTED TOUCH SENSING WITH FRUSTATED TOTAL INTERNAL REFLECTION

CROSS-REFERENCE TO RELATED APPLICATIONS

This application claims the benefit under 35 U.S.C. §119 (e) of U.S. Application No. 61/182,992 entitled "Touch Sensing," filed Jun. 1, 2009, which is incorporated herein by reference in its entirety.

TECHNICAL FIELD

This disclosure relates to touch sensing.

BACKGROUND

Touch sensitive systems refer, in general, to systems that detect and respond to multiple simultaneous points of contact on a surface. Typically, a touch sensitive system is incorporated within an electronic device in the form of a touch screen display that allows a user to both view and manipulate objects using one or more inputs that are in contact with the screen. Examples of electronic devices in which a touch sensitive system has been used include computer tablets, personal digital assistants (PDA), and cell-phones, among others. A variety of techniques are available that enable touch sensitive systems. For example, some touch systems identify surface contact by detecting changes in heat, pressure, capacitance or light intensity.

SUMMARY

This specification describes technologies relating to touch sensing. In general, one aspect of the subject matter described in this specification can be embodied in a touch-screen device that includes: a radiation source; a pliable waveguide configured to receive radiation emitted by the radiation source and to cause at least some of the received radiation to undergo total internal reflection within the pliable waveguide; a frustrating layer disposed relative to the pliable waveguide so as to enable the frustrating layer to physically contact the pliable waveguide when the pliable waveguide is physically deformed; and an imaging sensor configured to detect at least some radiation that escapes from the pliable waveguide. The frustrating layer is configured to cause frustration of the total internal reflection of the received radiation within the pliable waveguide at a contact point between the frustrating layer and the pliable waveguide when the pliable waveguide is physically deformed to contact the frustrating layer such that some of the received radiation undergoing total internal reflection within the pliable waveguide escapes from the pliable waveguide at the contact point.

This and other implementations may optionally include one or more of the following features. In some implementations, the frustrating layer may include a structure configured to steer at least a portion of the radiation that escapes from the pliable waveguide toward the imaging sensor. For example, the structure may include a light diffusing surface and/or a volume diffusing structure integral to the frustrating layer. In another example, the structure may include a diffraction pattern that corresponds to a grating structure. In some cases, the diffraction pattern may be formed by employing an interference pattern that is transferred to the structure, in which a series of fringes representing intensity minima or maxima of the transferred interference pattern correspond to the grating structure. The grating structure may include a blazed grating profile, a square-wave profile, a sinusoidal profile, and/or a half-sinusoidal profile. The square-wave profile may include a 1-bit binary diffraction grating profile. Alternatively, or in addition, the square-wave profile may include a multiple-bit modulated binary profile.

In another example, the structure may include an aperiodic diffraction pattern, in which a series of fringes representing intensity minima or maxima of an interference pattern transferred to the structure are arranged in an aperiodic pattern. Alternatively, or in addition, the fringes of an interference pattern correspond to planes of refractive index variation that are aligned substantially parallel with a surface of the frustrating layer on which the radiation is incident.

In some cases, the structure is on a surface of the frustrating layer that is nearest to the pliable waveguide and/or on a surface of the frustrating layer that is furthest from the pliable waveguide. The structure may be configured to steer by diffraction at least a portion of the radiation that escapes from the pliable waveguide toward the imaging sensor. The structure may be configured to steer by refraction at least a portion of the radiation that escapes from the pliable waveguide toward the imaging sensor. In an example, the structure may include an array of prisms.

In certain instances, the structure is divided into sub-structures and each sub-structure is configured to steer radiation that escapes from the pliable waveguide toward the imaging sensor.

In some implementations, the device includes a pliable frustrating layer disposed relative to the pliable waveguide so as to enable the pliable frustrating layer to contact the pliable waveguide when the pliable frustrating layer is physically deformed. The pliable frustrating layer may be configured to cause frustration of the total internal reflection of the received radiation within the pliable waveguide at a contact point between the pliable frustrating layer and the pliable waveguide when the pliable frustrating layer is physically deformed to contact the pliable waveguide layer such that some of the received radiation undergoing total internal reflection within the pliable waveguide escapes from the pliable waveguide at the contact point between the pliable frustrating layer and the pliable waveguide. In some implementations, the frustrating layer is disposed on a first side of the pliable waveguide layer and the pliable frustrating layer is disposed on a second opposite side of the pliable waveguide layer. The pliable frustrating layer may include a structure configured to steer at least a portion of the radiation that escapes from the pliable waveguide toward the imaging sensor.

In some implementations, the touch-screen device includes a display device adjacent to the frustrating layer. The display device may include a liquid crystal device, a light emitting diode device or an organic light emitting diode device. The frustrating layer may be fixed to the display device. The frustrating layer may be in optical contact with the display device. In some cases, the touch-screen device includes a coupling layer, in which the coupling layer is in contact with a side of the display device that is furthest from the frustrating layer and in which the coupling layer is configured to couple radiation out of the display device. The display device may include the imaging sensor. The imaging sensor may be embedded in the display device. In some implementations, the touch screen device also includes a screen projection layer, in which the screen projection layer includes a structure configured to diffuse at least a portion of light emitted from the display device. In certain implementations, the touch-screen device includes a screen projection layer and a structure configured to diffuse at least a portion of light emitted from the display device on to the screen projection layer.

The display device may include a structure configured to steer at least a portion of the radiation that escapes from the pliable waveguide toward the imaging sensor. The structure may include a polarizer or substrate of the display device. The structure may include a light diffusing structure. The light diffusing structure may include a surface diffusive layer or a volumetric diffusing structure.

In some implementations, the touch-screen device includes a cladding layer on a surface of the pliable waveguide. Alternatively, or in addition, the touch-screen device includes a cladding layer on the structure. Portions of the cladding layer may be located within grooves defined by the structure.

Another aspect of the subject matter described in this specification may be embodied in a touch-screen device that includes: a radiation source; a pliable waveguide configured to receive radiation emitted by the radiation source and to cause at least some of the received radiation to undergo total internal reflection within the pliable waveguide; a frustrating layer disposed relative to the pliable waveguide so as to enable a top surface of frustrating layer to contact the pliable waveguide when the pliable waveguide is physically deformed; an image generating layer disposed adjacent to a bottom surface of the frustrating layer that is opposite to the top surface of the frustrating layer, in which the image generating layer has a top surface facing the bottom surface of the frustrating layer and a bottom surface that is opposite from the top surface of the image generating layer; an imaging sensor configured to detect at least some of the radiation that escapes from the pliable waveguide; and a light-steering structure disposed adjacent to the bottom surface of the image generating layer, in which the light-steering structure is configured to steer at least a portion of the radiation that escapes from the pliable waveguide toward the imaging sensor. The frustrating layer is configured to cause frustration of the total internal reflection of the received radiation within the pliable waveguide at a contact point between the top surface of the frustrating layer and the pliable waveguide when the pliable waveguide is physically deformed to contact the top surface of the frustrating layer such that some of the received radiation undergoing total internal reflection within the pliable waveguide escapes from the pliable waveguide at the contact point. The image generating layer is configured to emit output images towards the frustrating layer and pliable waveguide and to be transmissive to radiation emitted by the radiation source.

This and other implementations may optionally include one or more of the following features. For example, in some implementations, the light-steering structure may be bonded to the bottom surface of the image generating layer. In other implementations, the top surface of the image generating layer is bonded to the bottom surface of the frustrating layer. The top surface of the image generating layer may be in optical contact with the bottom surface of the frustrating layer. The top surface of the image generating layer may be fixed to the bottom surface of the frustrating layer.

In some implementations, the image generating layer includes a liquid crystal device and/or a light emitting diode. The light emitting diode may include an organic light emitting diode. In some implementations, the image generating layer also includes integrated image sensing.

In some cases, the light-steering structure includes a light diffusing structure. The light diffusing structure may include a surface diffusive layer and/or a volumetric diffusive layer.

In some implementations, the light-steering structure includes a diffraction pattern corresponding to a grating structure. The structure can include an aperiodic diffraction pattern, in which fringes of the diffraction pattern correspond to planes of refractive index variation that are aligned substantially parallel with a surface of the frustrating layer on which the radiation is incident.

In certain implementations, the light-steering structure is configured to steer by diffraction at least a portion of the radiation that escapes from the pliable waveguide toward the imaging sensor.

In some cases, the light-steering structure is configured to steer by refraction at least a portion of the radiation that escapes from the pliable waveguide toward the imaging sensor.

In certain implementations, the touch-screen device includes a cladding layer on a surface of the pliable waveguide. Alternatively, or in addition, the touch-screen device includes a cladding layer on a surface of the light-steering structure.

In some implementations, the touch-screen device includes multiple imaging sensors, each imaging sensor being configured to detect at least some of the radiation that escapes from the pliable waveguide.

The details of one or more implementations are set forth in the accompanying drawings and the description below. Other features will be apparent from the description and drawings, and from the claims. The technology described herein can be employed in various implementations including single touch or multi-touch sensitive devices.

DETAILED DESCRIPTION

A touch-sensitive system can receive an input from various sources of contact which include, for example, a human finger, a stylus, and/or a mechanical object. FIGS. 1A-1D are diagrams of a user interacting with a multi-touch sensitive device 100. As illustrated in FIGS. 1A-1D, when a user contacts a touch-screen 102 of device 100 using one or more fingers, the device 100 detects the contact made by the user's finger(s) with the touch-screen 102 and tracks movement(s) made by the user's finger(s) along the surface of the touch-screen 102. Based on a detected path or paths traced by the user's finger(s) on touch-screen 102, device 100 can manipulate information in a corresponding display, whether the display is separate from touch-screen 102 or is integrated as part of touch-screen 102. Given that device 100 can detect contact from multiple inputs, many users may operate device 100 concurrently.

One approach for sensing the contact of one or more objects on a surface of a touch sensitive device involves sensing contact points on a waveguide by detecting points along the waveguide from which light is escaping the waveguide due to frustrated total internal reflectance (FTIR) occurring as a consequence of the contact being made on the waveguide. When light traveling in a first medium (e.g., a waveguide) encounters an interface with a second medium having a lower refractive index (e.g., air), the light traveling in the first medium may, depending on its angle of incidence with the interface, refract as it passes through the interface. If the angle of incidence is greater than a critical angle, on the other hand, the light will undergo total internal reflection (TIR) within the first medium. For example, waveguides such as fiber optic cables employ TIR to transport light efficiently with very little loss. In some cases, however, such total internal reflection of light can be frustrated by replacing the medium having the lower refractive index with another material that allows the light to escape from the waveguide. By sensing the escaped light, it may be possible to detect the location at which the new material was introduced.

Implementations of a touch sensitive device disclosed herein include a pliable waveguide that is configured to deform responsive to surface manipulation (e.g., pressure from a finger interacting with a display), which causes a portion of the waveguide at the location of the surface manipulation to physically contact a frustrating layer therebeneath. Light that travels along the waveguide, e.g., via total internal reflection, escapes at the point of contact to yield a detectable position of waveguide deformation, and hence surface manipulation (i.e., total internal reflection of light in the waveguide is frustrated at the point of contact between the waveguide and the frustrating layer).

Figure 1A:
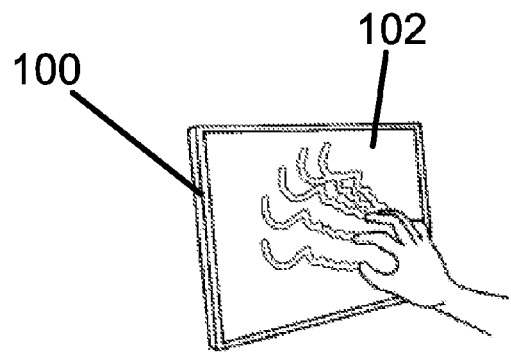
FIGS. 1A-1D are diagrams of a user interacting with a touch sensitive device.
Figure 1B:
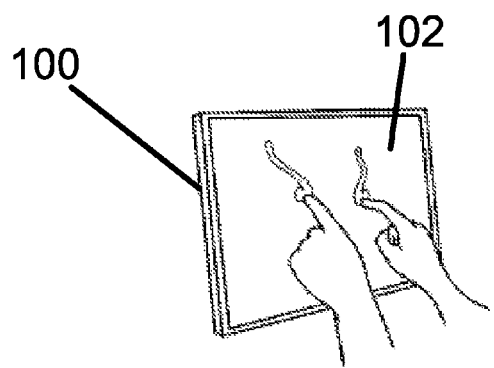
Figure 1C:
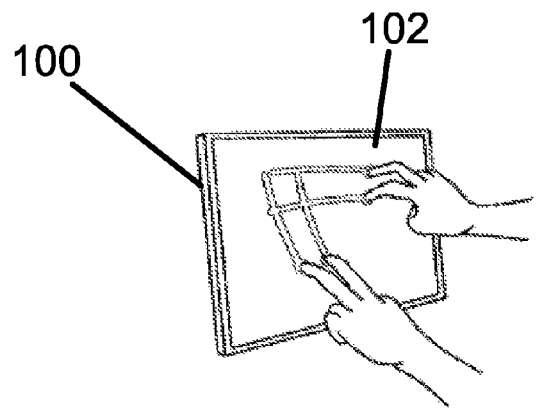
Figure 1D:
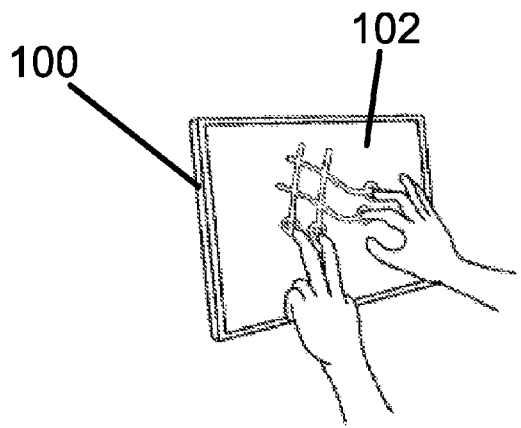
Figure 2A:
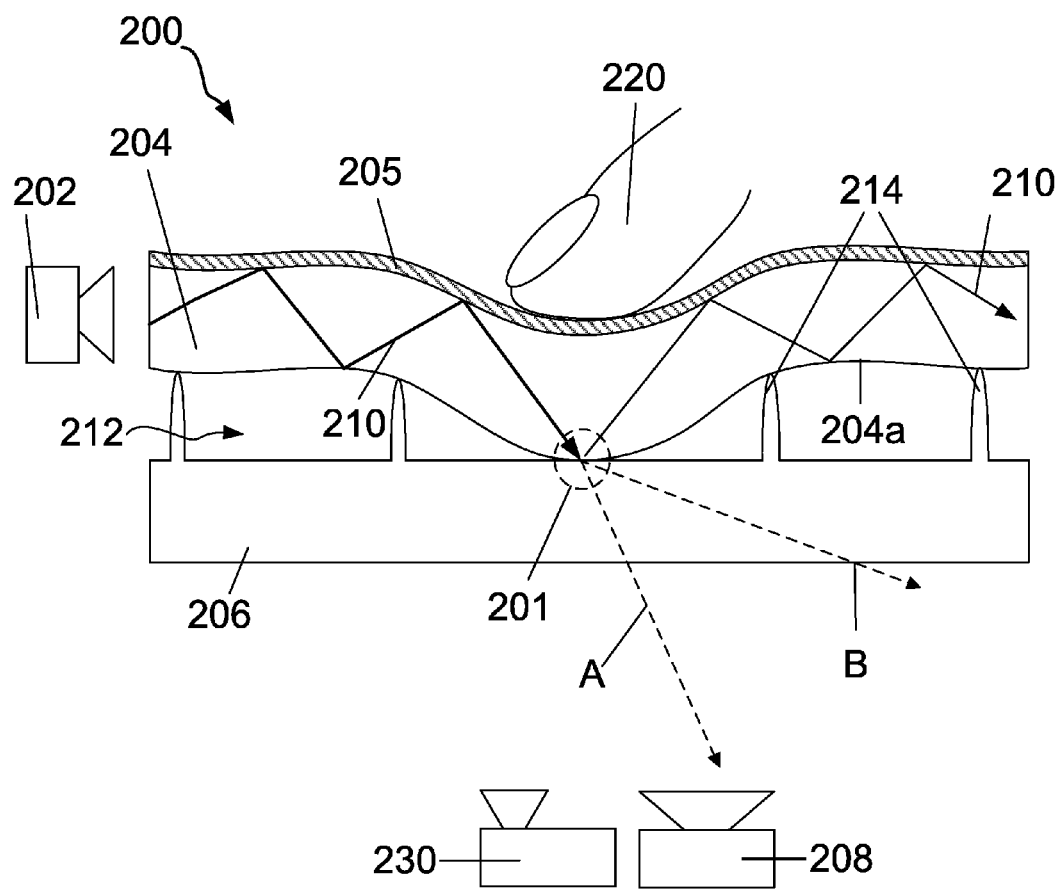
FIGS. 2A and 2B are schematic cross-sectional diagrams of examples of different touch sensitive devices.

FIG. 2A is a schematic cross-sectional diagram of an example of a touch sensitive device 200, in which a point of contact with device 200 is detected based on FTIR. As shown in FIG. 2A, device 200 includes a radiation source 202, a pliable waveguide 204, a frustrating layer 206 adjacent to waveguide 204 and an imaging sensor 208. Frustrating layer 206 is positioned relative to the pliable waveguide 204 such that a small gap 212 exists between frustrating layer 206 and pliable waveguide 204. In some implementations, protrusions 214 may be formed on or as part of frustrating layer 206 to maintain the gap 212 between the pliable waveguide 204 and the frustrating layer 206. In such implementations, protrusions 214 (e.g., surface roughness) can be formed integrally with frustrating layer 206, i.e., protrusions 214, together with frustrating layer 206, form a single mass of seamless, contiguous material. In some implementations, a micro-roughness layer having randomly (or semi-randomly) spaced protrusions may be formed on the surface of the frustrating layer 206, which function substantially as protrusions 214. In some cases, protrusions 214 are formed from material distinct from frustrating layer 206 and/or waveguide 204. For example, glass spacers could be used to separate an acrylic waveguide from a polycarbonate frustrating layer. The spacing between protrusions 214 can be random, pseudo-random or periodic.

Electromagnetic radiation (e.g., infrared (IR) radiation) is emitted from radiation source 202 and coupled into pliable waveguide 204. Due to the refractive index difference between pliable waveguide 204 and the medium surrounding waveguide 204, at least some of the coupled radiation then undergoes TIR and proceeds to travel down pliable waveguide 204. For example, waveguide 204 could be formed from a thin layer of compliant acrylic surrounded by air. Given the refractive index difference between acrylic (n=1.49) and air (n=1.0), radiation introduced by radiation source 202 into waveguide 204 at an appropriate angle of incidence propagates within and along the acrylic layer by TIR.

Waveguide 204 is formed from a material that is flexible enough to respond to pressure applied by an input such that sufficient contact can be made with frustrating layer 206. For example, waveguide 204 can be formed from materials such as acrylic/polymethylmethacrylate (PMMA), polycarbonate (PC), polyethylene terephthalate (PET) or transparent polyurethane (TPU). Other materials can be used as well.

In order to frustrate TIR of radiation propagating in waveguide 204, frustrating layer 206 is formed from material that has a refractive index comparable to or higher than compliant waveguide 204. Thus, when compliant waveguide 204 comes into contact with frustrating layer 206, at least a portion of the radiation propagating down waveguide 204 due to TIR is "frustrated" and escapes from waveguide 204. In some cases, at least a portion of radiation 210 continues to propagate by TIR in waveguide 204, as shown in FIG. 2A. Either a rigid or non-rigid material can be used to form frustrating layer 206. In addition, when integrated as part of a display, frustrating layer 206 may be formed from a material that is transparent (or at least transmissive) to the range of wavelengths emitted by a display light source. For example, frustrating layer 206 may be formed from glass or from PMMA, both of which are generally transmissive in both the visible and near-infrared regions of the spectrum. Alternatively, frustrating layer 206 can be formed from relatively pliable materials such as polyvinyl chloride (PVC), polyvinyl butyral (PVB), TPU, or from more rigid materials such as PET or PC. Other materials can be used as well.

Locally depressing waveguide 204 may cause substantial local deformation of frustrating layer 206 as waveguide 204 comes into contact with frustrating layer 206. In contrast, portions of frustrating layer 206 far from the region of contact between waveguide 204 and frustrating layer 206 may experience little or no deformation. Such pronounced local deformation may lead to an increase in the area of physical contact between compliant waveguide 204 and frustrating layer 206, thereby causing an increased amount of IR to escape from compliant waveguide 204 in the region of the point of contact.

In some implementations, frustrating layer 206 may be configured to have a substantially uniform thickness that is within a range of approximately 100 µm through 300 µm. In selecting an appropriate thickness for frustrating layer 206, the following considerations may be taken into account. If frustrating layer 206 is too thin, it may be difficult to manipulate and handle, for example, during manufacturing. On the other hand, if frustrating layer 206 is too thick, it may cause a parallax issue, where a user perceives a point of contact to be displaced (e.g., by the thickness of frustrating layer 206) from the actual displayed object with which the user is attempting to interact. In alternative implementations, frustrating layer 206 may be configured to be thinner than 100 µm (e.g., about 10 µm or about 30 µm) or thicker than 300 µm (e.g., about 1 mm or about 2 mm).

Due to the presence of air gap 212 between frustrating layer 206 and pliable waveguide 204, little or no frustration of TIR within waveguide 204 occurs absent some external stimulus. However, when pliable waveguide 204 is depressed by, for example, a user's finger 220, a portion of pliable waveguide 204 contacts frustrating layer 206 in a region 201 (identified by dashed line circle) corresponding to the point of depression. As described above, in some implementations, the contact between pliable waveguide 204 and frustrating layer 206 may cause local deformation of frustrating layer 206. When frustrating layer 206 contacts waveguide 204, total internal reflection within waveguide 204 is frustrated within region 201 causing at least some radiation to escape from the pliable waveguide 204. It should be noted that although protrusions 214 also contact waveguide 204, the area of contact between protrusions 214 and waveguide 204, when no pressure is applied to pliable waveguide 204, is relatively small compared to the area of contact between frustrating layer 206 and pliable waveguide 204 when pliable waveguide 204 is depressed. Accordingly, frustration of TIR that might occur in the regions of contact between protrusions 214 and waveguide 204 is negligible when no pressure is applied to pliable waveguide 204.

As shown in FIG. 2A, some of the radiation, represented by arrows "A," escapes from surface 204a of pliable waveguide 204 and travels in a direction towards imaging sensor 208. Imaging sensor 208 images the radiation that escapes from surface 204a. As a result, imaging sensor 208 can discriminately sense, for successive instants of time, points of contact that are sufficiently forceful to deform pliable waveguide 204 such that it contacts a substantial portion of frustrating layer 206 relative to the portion of frustrating layer 206 contacted by waveguide 204 when no pressure is applied. That is, for a "single" point of contact on waveguide 204, such as contact by finger 220 shown in FIG. 2A, a single "area" of contact corresponding to the portion of frustrating layer 206 that contacts waveguide 204 is discriminately sensed by imaging sensor 208. Likewise, when two or more objects (e.g., two or more fingers of a user) contact and depress waveguide 204 concurrently, multiple areas of contact are discriminately (and concurrently) sensed by imaging sensor 208. For ease of discussion, the term "a point of contact" may be used throughout this disclosure to refer more generally to any region or area at which contact is made.

Various detectors may be used as imaging sensor 208 including, for example, charge-coupled devices (CCDs), photo-diodes or complimentary metal-oxide-semiconductor (CMOS) sensors. In some cases, a lens is placed in front of imaging sensor 208 to focus light on sensor 208. Alternatively, or in addition the imaging sensor 208 may include one or more waveguides and/or lenses to assist guiding the incident radiation towards a detection area of a sensing device. The output of imaging sensor 208 is supplied to a suitable computer (not shown) or other electronic device capable of handling image-processing operations, such as rectification, background subtraction, noise removal, and analysis for each video frame. Machine vision tracking techniques then may be employed by the computer or other electronic device to translate the captured images into discrete touch events and strokes. Such processing may be carried out by any suitable computing system.

In some implementations, touch sensitive device 200 also is combined with a rear-projection source 230 (e.g., a video projector) that is capable of displaying visible images. Accordingly, touch sensitive device 200 can function as both a sensing and display device at the same time. In implementations where a rear-projection source 230 is used to generate output images, frustrating layer 206 may be configured to be diffusive in the visible spectrum such that frustrating layer 206 may operate as a screen onto which the output images projected by rear-projection source 230 are projected. Alternatively, device 200 may be configured to include a separate screen that includes a diffusive material or layer, which is diffusive in the visible spectrum such that the diffusive material or layer may operate as a screen onto which the output images projected by rear-projection source 230 are projected. The diffusive material/layer of the projection screen can be combined either alone or in combination with another diffuser film.

Although FIG. 2A shows projection source 230 arranged alongside imaging sensor 208, projection source 230 also can be disposed at other locations and/or away from imaging sensor 208, generally with the aid of suitable optics devices. As illustrated in FIG. 2A, device 200 may include a single imaging sensor 208 and a single projection source 230. In certain implementations, the distance between imaging sensor 208 and pliable waveguide 204 is large enough such that a field of view of sensor 208 is capable of imaging/detecting radiation escaping from waveguide 204 at substantially any point of contact along the surface of waveguide 204.

Figure 2B:
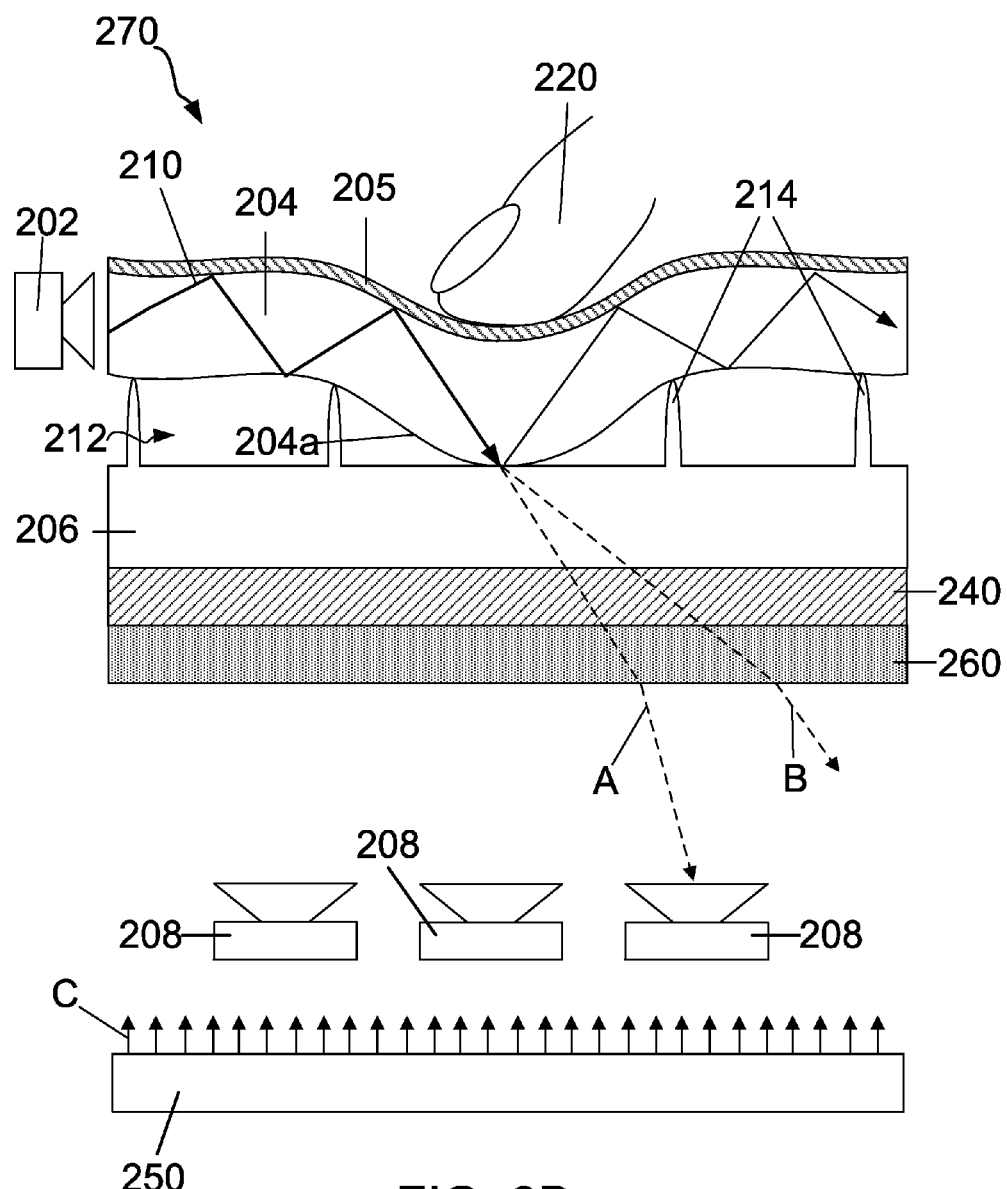

However, in other implementations, multiple projectors can be employed so that different images/videos can be projected onto different respective portions of a display. Alternatively, or in addition, multiple imaging sensors can be employed so that each image sensor has a field of view capable of imaging/detecting radiation escaping from different portions of waveguide 204. For instance, FIG. 2B illustrates one example of the use of multiple imaging sensors 208 within an FTIR-based touch sensitive device. Given the relatively small corresponding field of view, each imaging sensor 208 may be located closer to pliable waveguide 204. Accordingly, in some cases, thinner FTIR-based touch sensitive devices may be manufactured. In implementations of FTIR-based touch sensitive devices containing multiple imaging sensors, the imaging sensors and projectors may be spaced apart from one another along a single axis, multiple axes, along a grid system, or in other suitable manners. For example, the imaging sensors can be arranged such that there is no overlap between the field of view of adjacent sensors 208. Alternatively, the imaging sensors can be arranged such that the field of view of at least one sensor 208 overlaps with the field of view of one or more adjacent sensors 208. The output generated by each sensor then may be supplied to a suitable computer (not shown) or other electronic device capable of handling image-processing operations, and modified to form a composite image/data map corresponding to all or substantially all of the area over which points of contact with pliable waveguide 204 can be made. The composite image/data map then may be used to determine where along waveguide 204 points of contact occur.

Radiation source 202 can include multiple light emitting diodes (LEDs), which are arranged directly against an edge of waveguide 204 so as to maximize coupling of electromagnetic radiation into total internal reflection. Other sources of electromagnetic radiation, such as, for example, laser diodes, may be used instead. In some implementations, source 202 can be selected to emit radiation in the infrared (IR) portion of the electromagnetic spectrum such that its emissions do not interfere with visible light if device 200 is integrated into a display.

In some implementations, pliable waveguide 204 is formed from materials that support TIR of infrared light. In addition, when integrated as part of a display, pliable waveguide 204 may be selected so as to be transparent (or at least transmissive) to the range of wavelengths emitted by a display light source so as to minimize interference with the display. In some cases, the edges of pliable waveguide 204 are polished to maximize TIR coupling of radiation from source 202.

In some implementations, waveguide 204 may be configured to have a substantially uniform thickness that is within a range of approximately 0.50 mm through 2 mm. In selecting an appropriate thickness for waveguide 204, the following considerations may be taken into account. If waveguide 204 is too thin, an insufficient amount of radiation may be coupled into waveguide 204 from source 202. In implementations that utilize one or more lasers for light source 202, however, it may be possible to use a thinner waveguide 204 and still have a sufficient amount of radiation couple into the waveguide 204 than in implementations that utilize one or more LEDs as light source 202. Alternatively, if waveguide 204 is too thick, the waveguide may degrade the quality of output images displayed by the device.

In some cases, contacting waveguide 204 with a finger, stylus or other object can cause inadvertent frustration of total internal reflection within waveguide 204 even if waveguide 204 is not depressed enough to come into contact with frustrating layer 206. In addition, such objects may damage waveguide 204. Accordingly, in some implementations, a cladding layer 205 is positioned on top of pliable waveguide 204, either in optical contact with waveguide 204 or layered with a thin air gap between cladding layer 205 and waveguide 204. If the cladding layer is in optical contact with the waveguide, cladding layer 205 is formed of a material that has a refractive index lower than waveguide 204 to maintain total internal reflection of radiation within waveguide 204. Cladding layer 205 may prevent the occurrence of inadvertent FTIR and serves as a barrier between waveguide 204 and a contacting object. In addition, cladding layer 205 protects waveguide 204 from damage and/or contamination when waveguide 204 is contacted by an object such as a finger or stylus. When integrated as part of a display, cladding layer 205 also is transparent (or at least transmissive) to the range of wavelengths emitted by a display light source. For example, cladding layer can be formed of polytetrafluoroethylene (PTFE) or acrylic film.

Figure 2C:
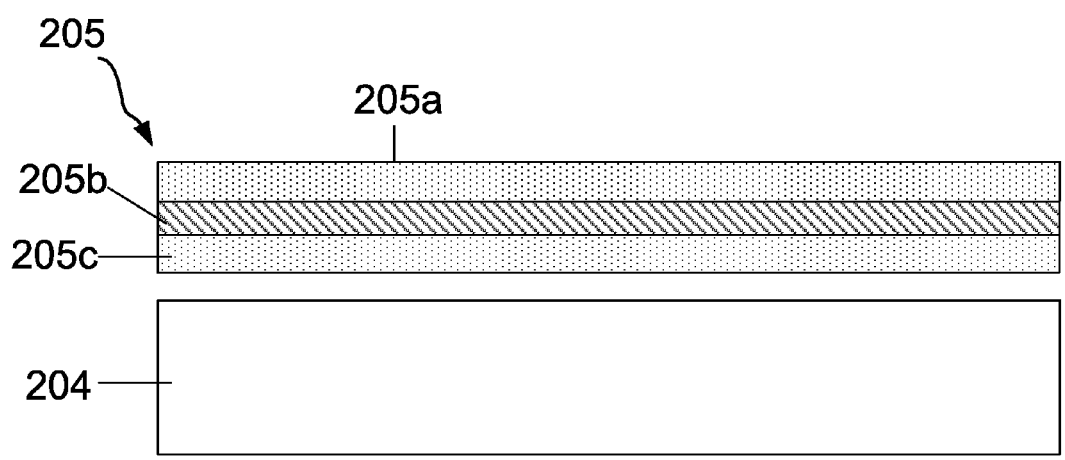
FIG. 2C is a schematic cross-sectional diagram of an example of a cladding layer.

In some implementations, the cladding layer includes multiple layers. FIG. 2C is a cross-sectional schematic of an example of a cladding layer 205 positioned above a waveguide 204, in which cladding layer 205 includes an anti-glare layer 205a, an infrared (IR) filter 205b and a non-wetting layer 205c. IR filter layer 205b functions to filter out ambient IR light incident on touch-sensitive device 200 so as to reduce (e.g., prevent) occurrences in which image sensors 208 detect the ambient IR light and erroneously detect contact with device 200. An example of material that can be used in an IR filter layer includes CLEARAS, commercially available from Sumitomo Osaka Cement Co., Ltd. Anti-glare layer 205a is a scratch-resistant, low friction film disposed on a top surface of IR filter layer 205b. A film that can be used as an anti-glare layer includes, for example, a textured polyester film such as AUTOTEX, which is commercially available from MacDermid Inc.

In some cases, substantial regions of cladding layer 205 may contact the pliable waveguide such that cladding layer 205 appears to "wet" the pliable waveguide. Such regions of "wetting" may inadvertently induce frustration of total internal reflection within the waveguide 204. Furthermore, the wetting regions may alter the amount of visible light that is reflected between waveguide and cladding layer resulting in portions of touch-sensitive device 200 that appear as blotches when dark images are displayed. By forming anti-wetting layer 205c on a bottom surface of IR filter layer 205b, however, the size and number of wetting regions may be reduced. Similar to anti-glare layer 205a, anti-wetting layer 205c also may be a polyester film, such as AUTOTEX.

The films in cladding layer 205 may be bonded together using, for example, an optical adhesive. In the example of FIG. 2C, an air gap exists between cladding layer 205 and pliable waveguide 204. The air gap between cladding layer 205 and pliable waveguide 204 may be maintained using, for example, the surface roughness of the bottom surface of cladding layer 205 (e.g., surface roughness of the non-wetting layer 205c).

In some implementations, liquid crystal display (LCD) technology or light emitting diode (LED) display technology, which includes organic light emitting diode (OLED) display technology, may be used to generate output display images instead of rear projection technology. Employing LCD or LED display technology instead of rear projection technology enables a touch-sensitive device that has reduced volume and thickness compared to a device which utilizes projector technology. Using either LEDs, OLEDs or LCD panels also may increase portability. Such "thin-panel" touch-sensitive systems can be used in laptop screens, flat-panel displays, PDA's and cell phones, among other devices. LCD panels, LED and OLED arrays can be used as the light source in any of the examples and implementations described herein.

For example, FIG. 2B is a schematic diagram of a cross-section of a touch sensitive device 270 that employs an LCD panel 240 and backlight 250 to generate a visible display. As illustrated in FIG. 2B, the LCD panel 240 and backlight 250 are disposed beneath frustrating layer 206. In the particular implementation shown in FIG. 2B, LCD panel 240 is arranged so that it is fixed to a bottom surface of frustrating layer 206. Although not shown, LCD panel 240 may include one or more components or layers such as, for example, a liquid crystal layer, a color filter layer, one or more polarizer layers, one or more electrode layers, and a substrate layer (e.g., a glass substrate). Other layers or components can be included as well. Similarly, LED and OLED panels can include, but are not limited to, one or more layers or components, such as a light emitting diode layer, an electrode layer, an adhesive/encapsulant layer and a substrate layer (e.g., a glass substrate).

In some implementations, frustrating layer 206 is directly bonded to LCD panel 240 using, for example, optical adhesive (not shown) having an index of refraction substantially close in value, e.g., within about 0.1, to the index of refraction of both frustrating layer 206 and LCD panel 240 to provide an optical contact between frustrating layer 206 and LCD panel 240. Optical adhesives, for example, may be optically clear pressure sensitive acrylics or silicones. In addition to adhering frustrating layer 206 to LCD panel 240, the presence of the optical adhesive can, in some instances, reduce reflections and/or interference that would otherwise occur due to the refractive index contrast at the surfaces of LCD panel 240 and frustrating layer 206. In particular, air gaps, which have a relatively low refractive index (n=1), are replaced with optical adhesive having a higher refractive index (n>1). Moreover, in some cases, the optical adhesive fills in roughness between the facing surfaces of panel 240 and layer 206, which would otherwise lead to additional light scattering. By reducing the amount of light reflected back toward the viewer, the image contrast provided by touch sensitive device 270 can be improved. Although frustrating layer 206 is shown fixed to LCD panel 240, frustrating layer 206 can, in some cases, be arranged in the FTIR-based touch sensitive device such that it does not adhere to the LCD panel 240.

Individual pixel portions within LCD panel 240 can be configured to block or transmit visible light, represented by arrows "C," emitted by backlight 250 in order to display an image. Furthermore, LCD panel 240 may be transparent to infrared light so that infrared light that escapes from surface 204a of pliable waveguide 204 passes through LCD panel 240 and can be imaged by imaging sensor 208. In some implementations, LEDs (or OLEDs) can be used as the light source in FTIR-based touch sensitive devices Because LEDs (OLEDs) themselves are emissive elements, in implementations in which LEDs (OLEDs) are used to generate output images, there may be no need for a backlight (e.g., backlight 250). Similar to LCD panel 240, such LEDs (OLEDs) may be transparent to infrared light and may be arranged in a layer that is bonded to frustrating layer 206.

In some implementations, the display device can include one or more image sensors 208 as part of the display device (e.g., image sensors 208 may be embedded on or within the display device). In some cases, LCD panel 240 may include photosensors alternating with thin film transistors that drive the liquid crystal cells of LCD panel 240. The photosensors may be made of photodiodes that are sensitive to IR light such as, for example, amorphous hydrogenated silicon germanium, a-SiGe:H photodiodes. The bandgap of such sensors is about 1.45 eV and could be used to detect light having a wavelength of approximately 850 nm. Alternatively, the photodiode material may have a bandgap tuned to match the wavelength of the source radiation. Given that the thin film transistors may also use an amorphous semiconductor, the photosensors can, in some implementations, be located on the same substrate that is used to support the thin film transistors. In order to detect primarily IR light as opposed to visible light, the photosensors may be covered with a filter that passes light in the IR wavelength range while reflecting or absorbing light having different wavelengths. An advantage of the foregoing implementation is that it enables touch sensitive devices that are thinner than devices that use discrete cameras situated beneath and apart from the display device. Other display devices also may include embedded photosensors. For example, an active matrix OLED device may include IR photodiodes alternating with OLED cells.

As illustrated in FIGS. 2A and 2B, radiation that escapes compliant waveguide 204 due to FTIR when the compliant waveguide 204 contacts frustrating layer 206 may travel in many different directions due to, for example, the surface texture of frustrating layer 206, bulk scattering within frustrating layer 206 or incomplete contact between compliant waveguide 204 and frustrating layer 206. For instance, some of the radiation that escapes from compliant waveguide 204 may travel in a direction away from frustrating layer 206, while some of the escaped radiation may travel towards frustrating layer 206. As a result, a portion of the escaped radiation, as shown by arrows "B" in FIG. 2B (and FIG. 2A), may never reach imaging sensor 208. One approach to enable capture of a sufficient amount of light from the frustrated TIR to yield position, despite the escaped radiation that never is imaged by imaging sensor 208, may be to increase the intensity of the radiation injected into the pliable waveguide 204. This approach, however, may cause operating efficiency to be diminished. Therefore, an alternative approach may be to configure frustrating layer 206 to collect and/or steer radiation that escapes compliant waveguide 204 and that is incident on frustrating layer 206 toward imaging sensor 208.

An additional alternative approach is to incorporate a light-steering layer 260 within the touch sensitive display device (see, e.g., FIG. 2B). Light-steering layer 260 may be configured to collect radiation that escapes from pliable waveguide 204 due to FTIR and modify the direction of the collected radiation. In some implementations, light-steering layer 260 may be a diffusive layer (e.g., a surface diffuser or a volumetric diffuser). Additionally or alternatively, light-steering layer 260 may be configured to steer incident light in one or more specific directions (e.g., toward imaging sensor 208).

Similar to frustrating layer 206, light-steering layer 260 may be formed of either a rigid or non-rigid material. In addition, when integrated as part of a display, light-steering layer 260 may be formed from a material that is transparent (or at least transmissive) to the range of wavelengths emitted by a display light source. For example, light-steering layer 260 may be formed from PMMA, TPU, PVC, PVB, PET, triacetate cellulose (TAC) or PC. Other materials can be used as well. In some implementations, a light diffuser, which is typically incorporated in the LCD backlight, also can function as the light-steering layer. In some implementations, light-steering layer 260 can be bonded to a bottom surface of LCD panel 240. Light-steering layer 260 can be bonded to a bottom surface of LCD panel 240 using optical adhesive to provide an optical contact between light-steering layer 260 and LCD panel 240. Alternatively, if LED (OLED) display technology is employed in place of LCD display technology, light-steering layer 260 can be bonded to a bottom surface of the LEDs (OLEDs) using, for example, optical adhesive to provide an optical contact.

In implementations in which frustrating layer 206 is configured to collect and/or steer radiation that escapes compliant waveguide 204 and that is incident on layer 206 toward imaging sensor 208, frustrating layer 206 may be configured to steer escaped radiation to within a range of angles such that the escaped radiation is steered towards a position on the imaging sensor 208 that is substantially beneath the point of contact between compliant waveguide 204 and frustrating layer 206. By collecting and steering radiation towards the optimal area of imaging sensor 208, the operating efficiency of touch sensitive devices 200 and 270 may be increased. As a result, less powerful radiation sources 202 may be used, and stray light issues may be reduced. Furthermore, by steering more of the FTIR escaped radiation towards imaging sensor 208, the probability of failing to sense contact with devices 200 and 270 may be reduced. The frustrating layer may be formed from an engineered material having light-steering microstructures formed within or on a surface of the engineered material, with the light-steering microstructures being configured to steer radiation/light in one or more particular directions.

Similarly, in implementations in which light-steering layer 260 is configured to collect and/or steer radiation that escapes from compliant waveguide 204, light-steering layer 260 may be configured to steer escaped radiation to within a range of angles such that the escaped radiation is steered towards a position at least one of the imaging sensors 208 that is substantially beneath the point of contact between compliant waveguide 204 and frustrating layer 206, as shown by arrows "A" in FIGS. 2A and 2B. Light-steering layer 260 may be formed from an engineered material having light-steering microstructures formed within or on a surface of the engineered material, with the light-steering microstructures being configured to steer radiation/light in one or more particular directions. Such light-steering microstructures may be adhered to or formed within or on the back surface of LCD panel 240, such that radiation/light is steered in one or more particular directions after passing through LCD panel 240. Similarly, engineered materials having light-steering microstructures may be adhered to or formed within or on the back surface of other light sources such as LED devices and OLED devices. Various implementations of such engineered materials and light-steering microstructure(s) for re-directing radiation that escapes from waveguide 204 may be employed within or on the frustrating layer 206 or light-steering layer 260.

Light-steering layer 260 may include, in addition to or as an alternative to light-steering microstructures, a diffuser layer. The diffuser layer can be configured to collect and/or steer radiation escaping compliant waveguide 204 and incident on the light-steering layer 260 toward imaging sensor 208. In particular, the diffuser layer may cause incident radiation to propagate in a direction generally beneath a point at which the radiation escapes compliant waveguide 204 or to generally spread in a broad range of directions instead of very limited or specific directions. The diffuser layer may be formed of material including, but not limited to, PET, PVC, PVB, PMMA or PC. The diffuser layer may have a substantially uniform thickness of about 100 microns, although other thicknesses may be used as well.

In some implementations, diffuser layer can include surface diffusing structures that are formed on or within a surface of a material such as LCD panel 240. In some cases, the surface diffusing structures are formed by roughening a surface of a material in LCD panel 240. For example, surface diffusing structures may be formed by roughening a surface of a glass substrate or polarizer layer of LCD panel 240 to form a surface that diffuses radiation that has escaped from compliant waveguide 204 and is incident on LCD panel 240. Similarly, if an LED or OLED device is used in place of LCD panel 240, a surface of a material in the LED or OLED device such as, for example, a glass substrate can be roughened to form a surface that diffuses radiation that has escaped from compliant waveguide 204 and is incident on LCD panel 240.

The surface of components within or fixed to LCD panel 240 can be roughened using one or more methods. For example, in some implementations, a roughened "master surface" can be used as a mold for forming a rough surface on the material on or within LCD panel 240. Initially, the master surface may be a smooth surface (e.g., a smooth glass or metal surface) that is roughened using abrasives including, for example, sandpaper, sandblasting, or hard powders. The roughened surface may also be created by treating the originally smooth master surface with an etchant (e.g., an acid) to create random pits in the smooth surface. For example, clear glass may be roughened by etching the surface with hydrofluoric acid. Other methods for roughening can be used as well. The roughened master surface then may be used to emboss the rough pattern into a plastic film, such as a polarizer of LCD panel 240. Instead of using a master surface for embossing, the material within or on LCD panel 240 may be roughened directly using the same techniques as described above.

In some implementations, the roughened surface, whether as a part of a polarizer, glass substrate or other component within or on LCD panel 240, has a level of average roughness (i.e., the arithmetic average of a surface deviation from average depth) in the range of about 0.2 to 50 microns Ra. In some cases, the roughened surface also has a root mean squared roughness of about 0.2 to 50 microns. A level of diffusion for light incident on a roughened surface may be measured in terms of light spreading angle (i.e., the approximate angular distribution of incident collimated light after it passes through the diffuser). In some implementations, diffusers with the foregoing levels of roughness have diffusion angles over approximately 160 degrees.

Alternatively, or in addition to surface diffusing structures, a diffuser layer can include volume diffusing structures that are formed integrally through at least a portion of the material bulk. In some implementations, the engineered microstructures may be employed within or on a surface of the diffuser layer.

In some implementations, radiation that escapes from pliable waveguide 204 due to FTIR may become trapped within LCD panel 240 (or LED device) after being received by LCD panel 240 (or LED device). In such cases, light-steering layer 260 may, when placed in contact with or formed on or within a surface of LCD panel 240 (or LED device), function as a coupling layer to couple the trapped radiation out of LCD panel 240 (or LED device). In some implementations, LCD panel 240 (or LED device) can be placed in optical contact with light-steering layer 260 using, for example, an optical adhesive having an index of refraction substantially close in value to a bottom surface of LCD panel 240 (or LED device) and light-steering layer 260 to enhance out-coupling of trapped radiation. In addition to adhering LCD panel 240 to light-steering layer 260, the presence of the optical adhesive can, in some instances, reduce reflections that would otherwise occur due to the refractive index mismatch and surface roughness at the surfaces of LCD panel 240 and light-steering layer 260.

In some cases, the engineered microstructures which are employed on or within frustrating layer and/or light-steering layer include diffractive optical elements (DOEs). In general, a DOE structure is a structure that includes a pattern of refractive index variations on the order of a wavelength of light and which primarily diffracts incident radiation. A DOE structure can be generated digitally or recorded optically as an interference pattern between two wavefronts of coherent light. In some implementations, the patterns of refractive index variations in the DOEs may be formed by transferring an interference pattern to material such that a series of fringes representing intensity minima and maxima of the interference pattern correspond to the patterns of refractive index variation. For example, interference patterns can be transferred to a recording material using techniques such as interference lithography. The pattern can be represented by a periodic, random, semi-random, or mathematically complex, deterministic variation of refractive index or thickness across one or more different materials. In some cases, the fringes of the transferred interference pattern correspond to a grating structure. Depending on the design and construction, a DOE structure transmits or reflects incident radiation in one or more directions. DOE structures can include surface diffusing structures that are formed on or within a surface of a material, or volume diffusing structures that are formed integrally through at least a portion of the material bulk.

DOE structures include a class of structures called holographic optical elements (HOE) that may be considered to fall within two categories: thin hologram structures and thick (volume) hologram structures. In general, thin hologram structures include surface structures or planes of refractive index variation that vary substantially perpendicularly to the surface on which the radiation is incident and are generally used to transmissively steer a range of wavelengths into one or more particular directions. They can be used in conjunction with a separate reflective means, such as a mirror, to operate reflectively. Thick hologram structures, on the other hand, can include planes of refractive index variations that run substantially parallel to the surface on which radiation is incident, and generally use Bragg selectivity to reflect or transmit a narrow range of wavelengths incident at one or more specific incident angles into one or more particular directions.

In some implementations, the planes of refractive index variations in the HOEs may be formed by transferring an interference pattern to material such that a series of fringes representing intensity minima and maxima of the interference pattern correspond to the planes of refractive index variation. For example, interference patterns can be transferred to a recording material using techniques such as interference lithography. In some cases, the fringes of the transferred interference pattern correspond to a grating structure.

Optical modeling software packages are available to facilitate the design of thin or thick hologram structures to direct radiation in a desired direction. CODE V® is one example of such an optical modeling software package that can be used to design thin or thick hologram structures to direct radiation in a desired direction. Other optical modeling software packages also are available.

Examples of frustrating layers having several different types of thin hologram structures for steering escaped radiation are illustrated in FIGS. 3-8. The various different frustrating layers illustrated in FIGS. 3-8 can be incorporated within touch sensitive devices, such as, for example, the touch sensitive devices 200 and 270 illustrated in FIGS. 2A and 2B.

Figure 3:
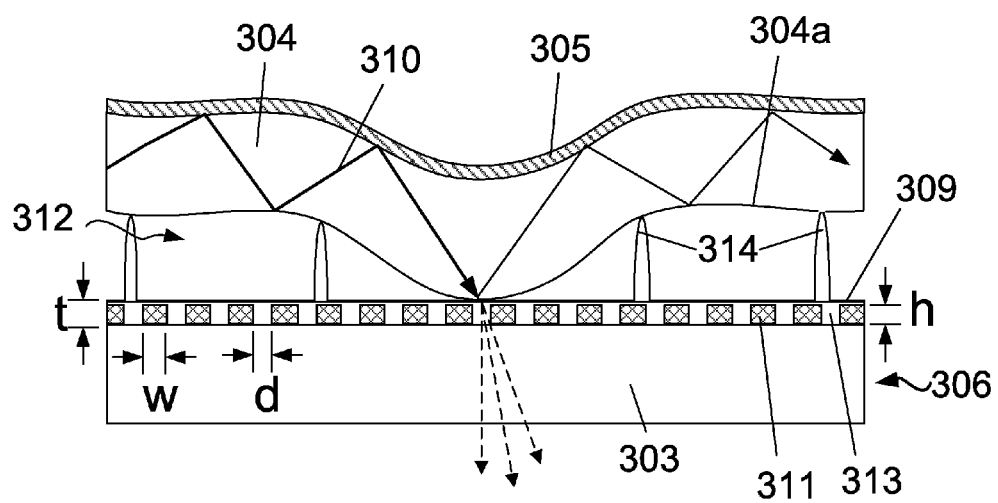
FIGS. 3-13 are schematic cross-sectional diagrams of examples of different configurations of waveguides and frustrating layers for incorporation within a touch sensitive device.

FIG. 3 is a schematic diagram of a cross-section of a pliable waveguide 304 that includes cladding layer 305 and a frustrating layer 306 that includes a thin hologram structure 309. As illustrated in FIG. 3, thin hologram structure 309 is formed on a surface of substrate 303 and comes into contact with compliant waveguide 304. Thin hologram structure 309 has a 1-bit binary (or more generally square-wave) diffraction grating profile. Grating 309 may be formed from the same material as frustrating layer 306 or from a different material. Grating 309 may be formed from a series of regularly spaced structures 311 having thicknesses h and widths w that are spaced apart from one another by a distance d. Furthermore, the length of structures 311 extends uniformly across the surface of frustrating layer 306 (i.e., into and out of the page). The direction of radiation transmitted by grating layer 309 is a function of the periodicity, $\Pi=w+d$, of grating structures 311 and the radiation wavelength.

In some cases, grating layer 309 may include a cladding layer 313. In such implementations, the cladding layer 313 protects grating structures 311 of grating layer 309 from damage and may fill the spaces between grating structures 311. Grating structures 311 and cladding layer 313 may be formed from material that is transmissive to radiation having a wavelength equal to the wavelength of radiation 310 traveling through waveguide 304. If the touch sensitive device incorporates a display, grating structures 311 and cladding layer 313 also may be transparent (or at least transmissive) to the wavelengths of radiation (e.g., visible light) used to generate the display. The cladding 313 can be formed of a material that has a refractive index comparable to or greater than the refractive index of waveguide 304 to allow FTIR to occur upon contact with waveguide 304. In addition, cladding layer 313 can be formed to have a thickness t that is greater than thickness h of grating structures 311.

Protrusions 314 maintain a small gap 312 between frustrating layer 306 and compliant waveguide 304 when an external stimulus is not present. When pressure is applied by an input (not shown) to a portion of pliable waveguide 304, pliable waveguide 304 is deformed and a surface 304a of pliable waveguide 304 comes into contact with frustrating layer 306. As a result, a portion of radiation 310 traveling through pliable waveguide 304 undergoes FTIR. The portion of radiation 310 which undergoes FTIR then escapes from compliant waveguide 304 in multiple directions.

As illustrated in FIG. 3, transmissive thin hologram structure 309 steers radiation that escapes from pliable waveguide 304 in a direction generally perpendicular to a surface of frustrating layer 306 that is in contact with waveguide 304, so that the escaped radiation is aligned with the point of contact between compliant waveguide 304 and frustrating layer 306.

Figure 4:
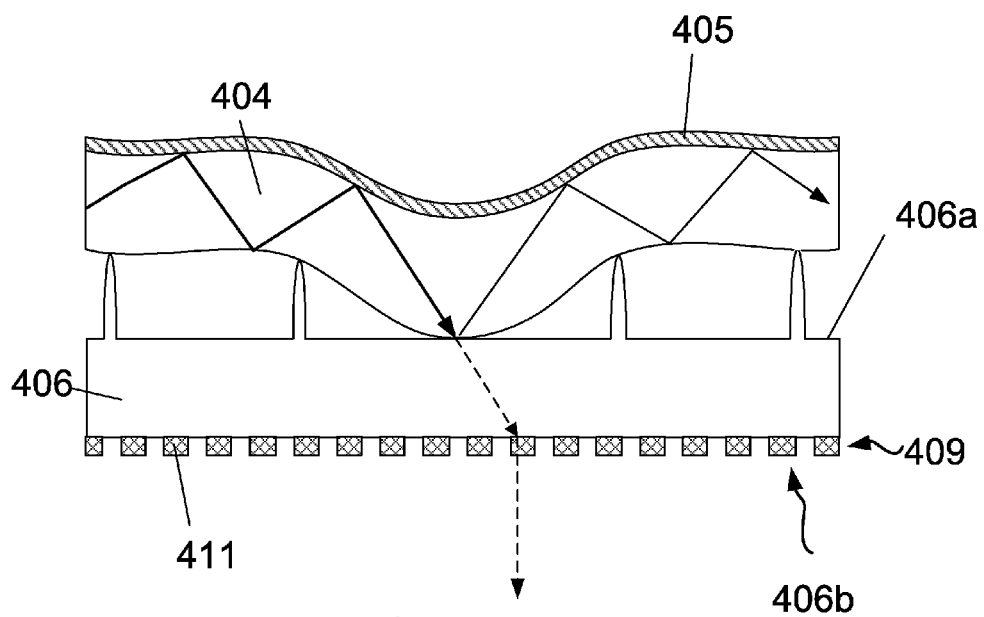

Although FIG. 3 illustrates thin hologram structure 309 being formed on a surface 306a of frustrating layer 306 that comes into contact with waveguide 304, a thin hologram structure additionally or alternatively can be formed on a surface of a frustrating layer that does not come into contact with waveguide 304. Accordingly, in some implementations, interference between visible light, emitted from an LCD panel or display source, and the hologram structure can be reduced. For example, FIG. 4 is a schematic diagram of a cross-section of a pliable waveguide 404 that includes cladding layer 405 and a frustrating layer 406 that includes a transmissive diffraction grating 409 formed on a surface 406b of frustrating layer 406 that is opposite from the surface 406a that makes contact with pliable waveguide 404. Similar to grating 309, grating 409 may include a series of regularly spaced grating structures 411. A portion of radiation that escapes from waveguide 404 travels through frustrating layer 406 and then is re-directed by grating 409 in a direction that is generally perpendicular to a surface 406a of frustrating layer 406 and that is aligned with the point of contact between compliant waveguide 404 and frustrating layer 406.

Figure 5:
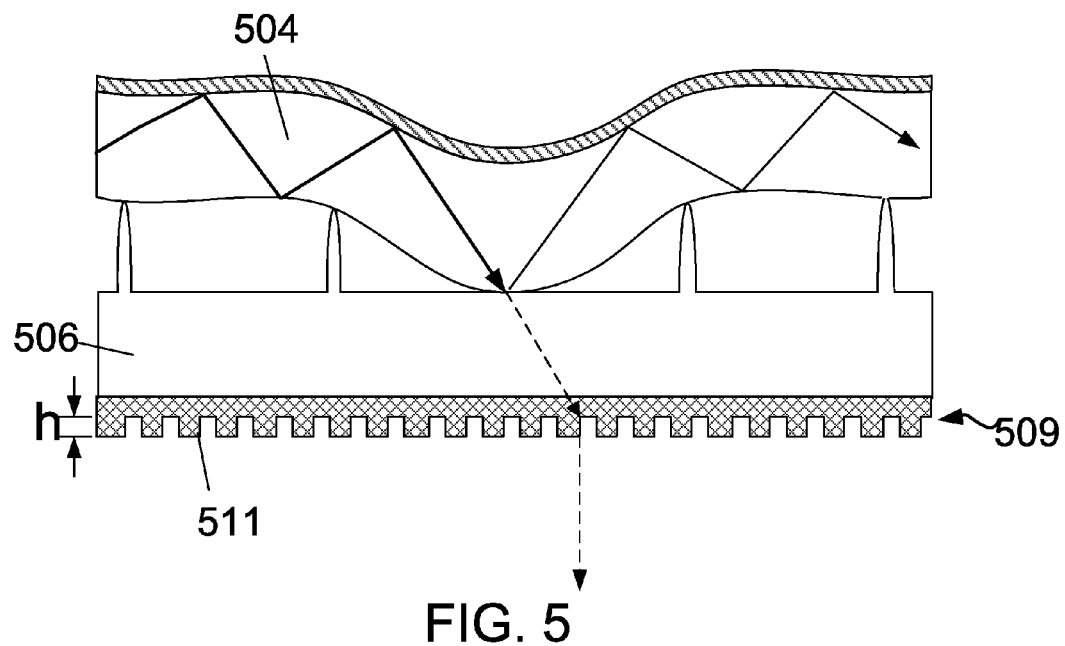
Figure 6:
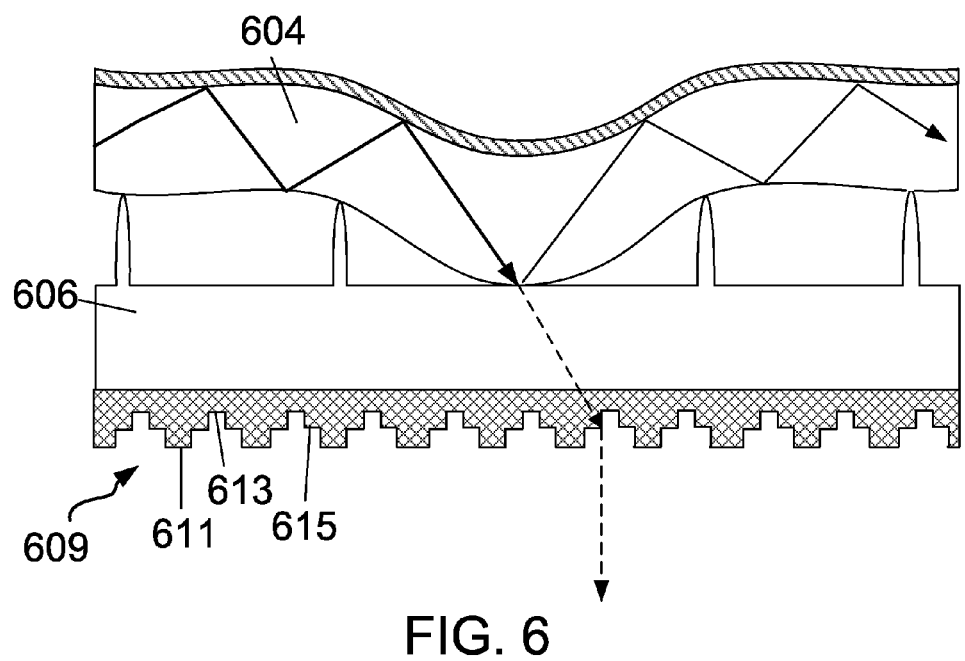

Other variations of thin hologram structures having surface-relief profiles also may be incorporated within or added to a frustrating layer to steer radiation in a desired direction. For example, FIG. 5 shows a grating structure 509 formed on a surface of a frustrating layer 506 in which the depth h of the surface-relief does not extend all the way to the surface of frustrating layer 506. That is to say, grating structure 509 is offset from a surface of frustrating layer 509. As in previous examples, at least a portion of radiation propagating by TIR in waveguide 504 may escape when waveguide 504 is depressed so as to come into contact with frustrating layer 509. FIG. 6 shows another example of a frustrating layer 606 which can be used to frustrate TIR in a waveguide 604. Frustrating layer 606 includes a grating layer 609 having a multi-level or multiple-bit modulated binary profile. As illustrated in FIG. 6, the multiple-bit modulated binary profile includes ridges 611 and grooves 613 separated by shelves 615.

Figure 7:
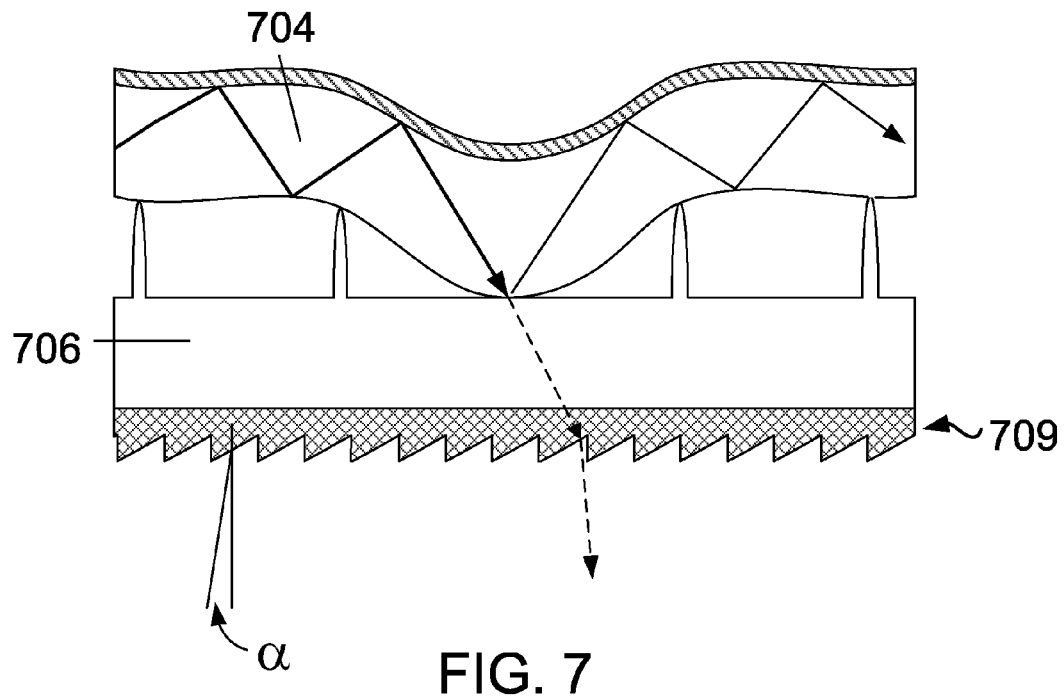

In addition to merely steering radiation in a desired direction, thin film hologram structures also can be used to improve the efficiency with which radiation is transmitted in a particular direction. For example, FIG. 7 shows a frustrating layer 706 for frustrating TIR in a waveguide 704, in which a blazed grating structure 709 is formed on a surface of frustrating layer 706. As illustrated in FIG. 7, the grooves of the diffraction grating 709 form a triangle profile with a blaze angle, α. The blaze angle α is a measure of the blaze slope with respect to a normal to the plane on which the blaze structure 709 is formed. Changing the spacing between the blazed ridges determines the output direction (the separation between diffractive orders) of the transmitted radiation while changing the blaze angle α affects the efficiency in which incident radiation is transmitted in a particular diffractive order.

Grating structures formed within or on frustrating layers can have other profile shapes besides binary and blazed profiles. For example, grating structures can be formed to have a sinusoidal profile (i.e., symmetrical, sine-wave shaped grooves) or semi-sinusoidal (i.e., symmetrical, half sine-wave shaped grooves) profile. A wide range of profiles can be fabricated using diamond-turning machines to generate master structures, which can then be replicated. Holographic optical elements can be considered as a generalized case of gratings, where the structure can be periodic, aperiodic, random or noisy, or some combination of these. In addition, they can also vary continuously or discretely (piecewise) across their aperture.

Figure 8:
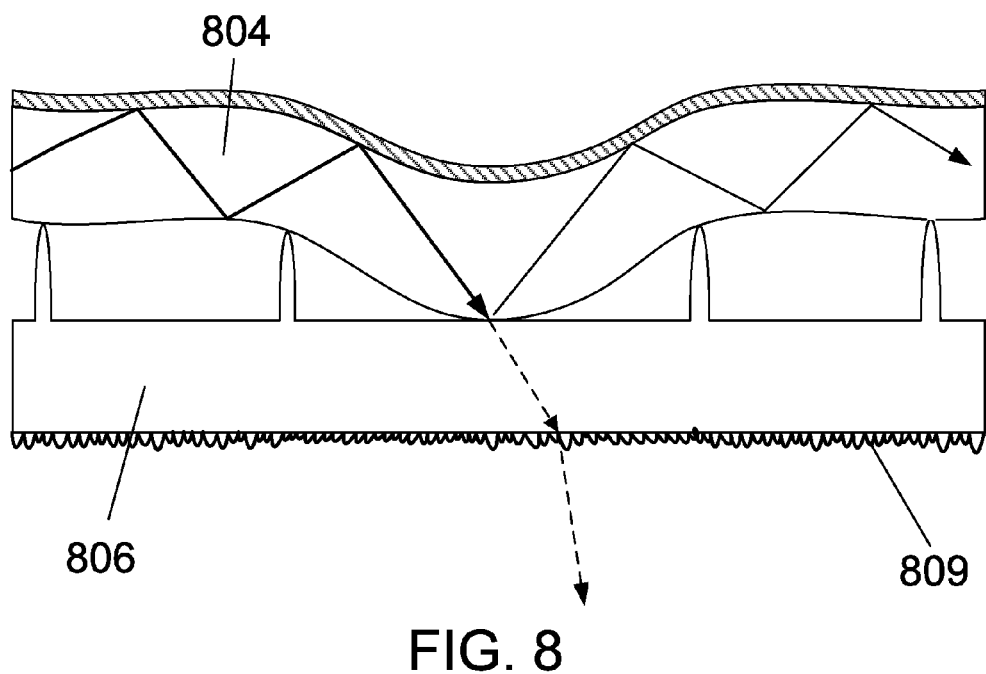

Although the thin hologram structures illustrated in FIGS. 3-7 are periodic, thin film holograms having aperiodic grating structures also can be formed within or on a frustrating layer to control radiation received by the frustrating layer. In some cases, the thin film hologram structure comprises a diffraction pattern in which fringes of the diffraction pattern are arranged in an aperiodic pattern. The fringes of the diffraction pattern may correspond to regions in which an intensity of light transmitted or reflected by the diffraction pattern is a minima or maxima. Alternatively, or in addition, the fringes may correspond to planes of refractive index variation. Such non-periodic hologram structures may further increase efficiency and/or wavelength selectivity. In some implementations, an aperiodic hologram structure designed to transmit a large portion of escaped radiation in a particular direction may include profiles that are semi-random or random. For example, FIG. 8 shows a frustrating layer 806 for frustrating TIR in a waveguide 804, in which frustrating layer 806 includes a thin hologram structure 809 having a random/aperiodic profile 809a. As illustrated in FIG. 8, the height of structure 809 varies over frustrating layer 806, thus acting as a diffuser or noise grating with air or other cladding in which incident radiation is exposed to a variation in refractive index. Furthermore, a semi-random diffuser pattern can be designed to diffract the light into a desired range of angles. Two examples of such designed diffusers are the LIGHT SHAPING DIFFUSERS® made by Luminit™ Corporation of Torrence, Calif. and MICRODIFFUSERS® by Wavefront Technology of Paramount, Calif.

The thin film hologram structures described in connection with FIGS. 3-8 can be formed from the same or a different material than the frustrating layer. For example, diffusers, thin holograms, and gratings can be embossed onto a substrate formed of PET, PMMA or PC. The embossing shims are made from diamond-turned, digitally or optically generated masters. Another common means of replication is to photo-cure impressions of the structures in resin on a PET or other substrate material. Additionally or alternatively, in some implementations, a cladding layer (not shown) having approximately uniform thickness throughout may be disposed on a surface of the thin film hologram structures described in connection with FIGS. 3-8. The cladding layer may be formed from a material that is transparent (or at least transmissive) to visible light emitted by the display source and can protect the thin film hologram structures from damage.

As discussed above, thick hologram structures are another type of DOE structure that can be formed within or on a frustrating layer to steer radiation that escapes a waveguide due to FTIR when the waveguide comes into contact with the frustrating layer. One characteristic of thick holograms is that the hologram is made up of layers corresponding to a periodic variation of transmittance or refractive index that is, to at least some extent, parallel to the hologram surface on which the radiation is incident. In thick holograms, light is transmitted by means of Bragg diffraction, i.e., light having the correct wavelength and beam shape (e.g., beam direction, wavefront profile) will be preferentially transmitted by the thick hologram whereas other light will be reflected or absorbed. Thus, in contrast to thin hologram structures, a thick hologram structure serves to transmit a relatively small range of wavelengths across a narrow range of incident angles into a relatively small range of output angles. For example, radiation having a wavelength of 850 nm undergoing FTIR may be transmitted by a thick hologram structure towards a normal of the waveguide in which the radiation travels, whereas visible light can travel unaffected through the thick hologram structure.

Thick hologram structures lead to generally higher diffraction efficiency than in thin hologram structures. Diffraction efficiency corresponds to the amount of light diffracted by the hologram relative to the total amount of light incident on the hologram. Thick holograms can be replicated from optically generated masters into photopolymer by contact copying.

Figure 9:
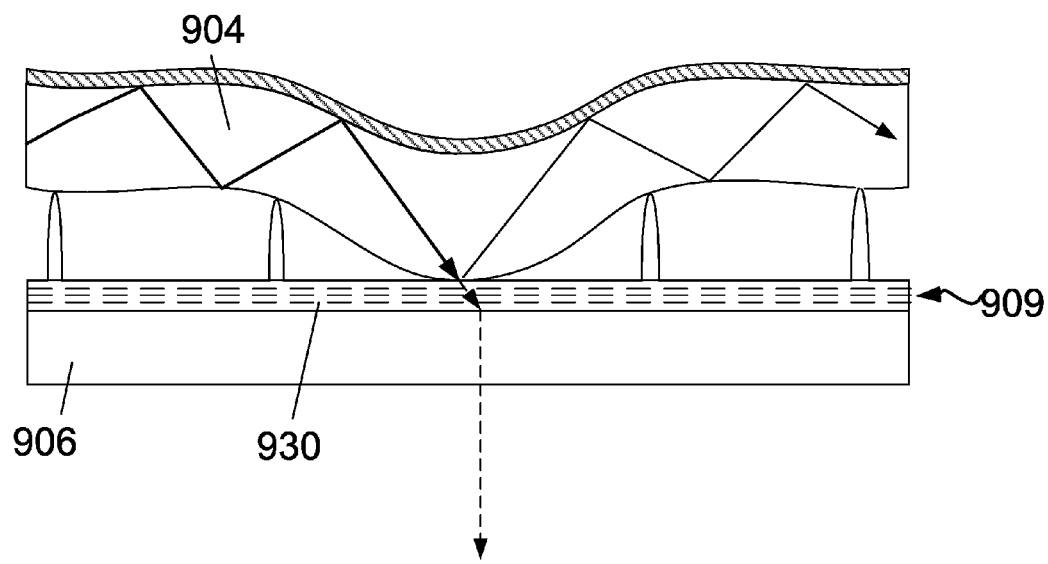

FIG. 9 is a schematic diagram of a cross-section of an example frustrating layer 906 for frustrating TIR in a waveguide 904, in which the frustrating layer 906 includes a thick hologram structure 909. Thick hologram structure 909 includes layers of material having a variation in refractive index. Due to the refractive index variation, the layers of material form a series of fringe planes 930. Fringe planes 930 control either the reflection or transmission of incident radiation in a manner similar to a multilayer dielectric film. The material and dimensions of the layers of refractive index modulated material in a thick hologram structure are configured to transmit radiation received by frustrating layer 906 within a particular range of angles. Example materials for a thick hologram structure include photopolymer and bleached silver halide. In some implementations, thick hologram structures are formed integrally with frustrating layer 906, i.e., thick hologram structures, together with frustrating layer 906, form a single mass of seamless, contiguous material. For example, as illustrated in FIG. 9, thick hologram structure 909 occupies the entire thickness of frustrating layer 906. In some cases, however, thick hologram 909 can be formed separate from and on a surface of frustrating layer 909 instead of being incorporated within frustrating layer 909.

FIGS. 3-9 illustrate different hologram structures for steering radiation that escapes from the pliable waveguide. As illustrated in FIGS. 3-9, these hologram structures are formed either on the surface of or within the volume of a frustrating layer. As an alternative (or in addition) to forming these hologram structures on the surface of or within the volume of the frustrating layer, each of these hologram structures may be formed on the bottom surface of an LCD layer (similarly to how light-steering layer 260 is formed on the bottom surface of LCD layer 240 in FIG. 2B), within the volume of a diffusive layer (e.g., light-steering layer 260 in FIG. 2B) that is adhered to the bottom surface of an LCD layer (e.g., LCD layer 240 in FIG. 2B), or on the bottom surface of a diffusive layer (e.g., light-steering layer 260 in FIG. 2B). Locating the hologram structures beneath the LCD layer may result in less interference with output images generated by the LCD layer than locating the hologram structures on a surface of or within the frustrating layer because, when the hologram structures are located beneath the LCD layer, they are not in the optical path between the LCD layer and a viewer.

Figure 10A:
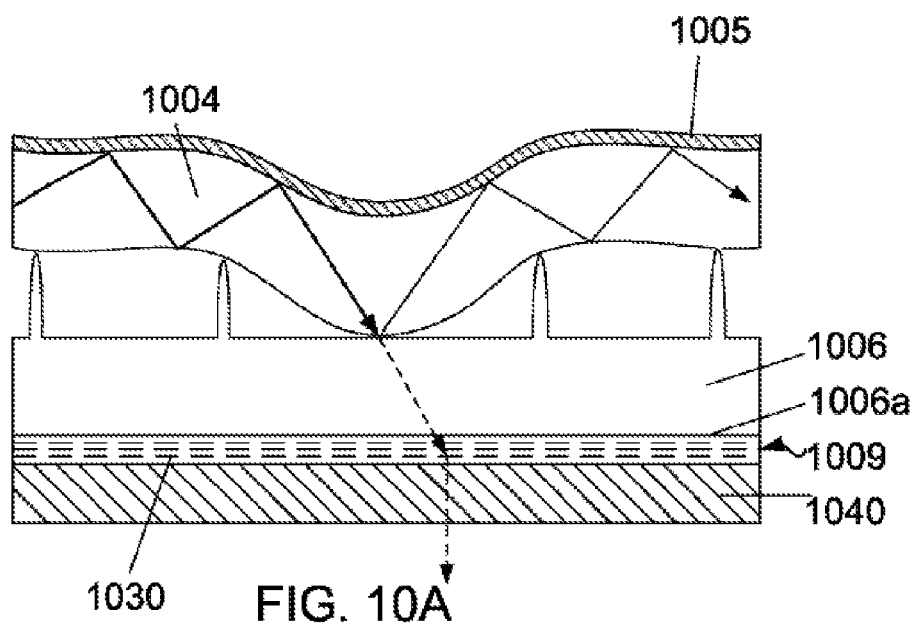

FIG. 10A is a schematic cross-sectional diagram of an example of a frustrating layer 1006, a hologram structure 1009, and a LCD layer 1040 for incorporation within a touch sensitive device. Hologram structure 1009 is formed on a top surface of an LCD panel 1040 and is configured to re-direct radiation towards an imaging sensor. Similar to hologram structure 909 shown in FIG. 9, structure 1009 is a thick hologram and includes layers of material having a variation in refractive index. Due to the refractive index variation, the layers of material form a series of fringe planes 1030. Other diffractive optical elements may be formed on LCD panel 1040, as well.

Figure 10B:
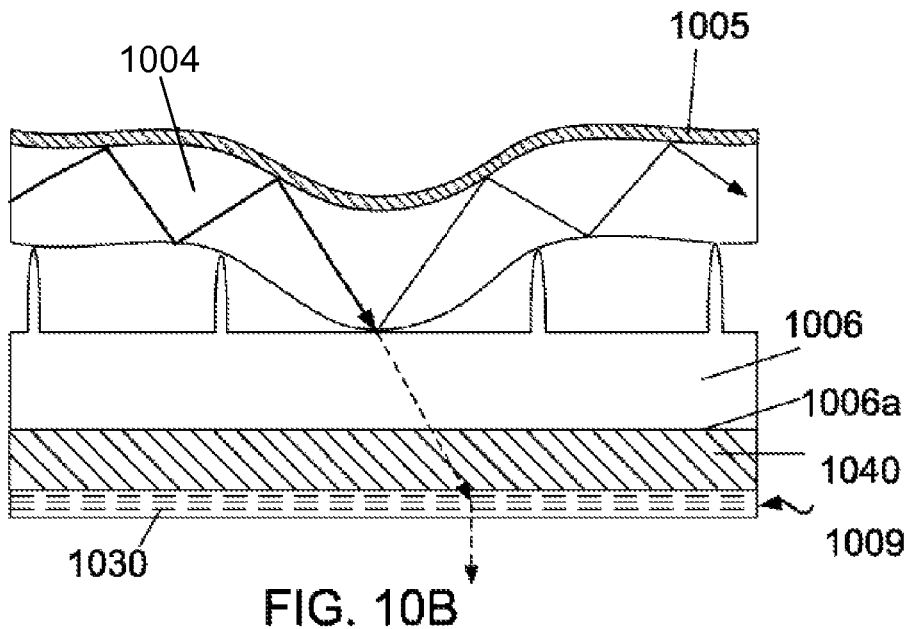

In contrast to the implementation illustrated in FIG. 10A, in some implementations, thick hologram structure 1009 is formed on a bottom surface of LCD panel 1040 (i.e., on a surface of LCD panel 1040 that is opposite from frustrating layer 1006), as illustrated in FIG. 10B. Locating the hologram structure 1009 beneath LCD panel 1040 may reduce interference with output images emitted by LCD panel 1040. As shown in the examples of FIGS. 10A-10B, radiation undergoing TIR in waveguide 1004 having cladding layer 1005 is frustrated upon contact with frustrating layer 1006. The frustrated radiation propagates through frustrating layer 1006. Upon reaching hologram structure 1009 bonded to either the front or the rear surface of LCD panel 1040, the radiation then is steered by the hologram structure 1009 within a narrow range of angles that are substantially orthogonal to the plane 1006a of frustrating layer 1006. Accordingly, the radiation then proceeds towards a position on an imaging sensor that is substantially beneath the point of contact between compliant waveguide 1004 and frustrating layer 1006.

When frustrating layer 1006 is laminated to LCD panel 1040, for example, as illustrated in FIG. 10B, radiation that escapes from pliable waveguide 1004 due to FTIR may become trapped within LCD panel 1040 (e.g., by TIR) after being received by LCD panel 1040. However, when hologram structure 1009 is placed in optical contact with a bottom surface of LCD panel 1040 as shown in FIG. 10B, hologram structure 1009 can, in some implementations, serve to couple the trapped radiation out of LCD panel 1040. Alternatively, if hologram structure 1009 is on a top surface of LCD panel 1040, a coupling layer may be placed in contact with the bottom surface of LCD panel 1040 to couple trapped radiation out of LCD panel 1040. In some implementations, hologram structure 1009 on a top surface of LCD panel 1040 is configured to steer radiation that escapes from pliable waveguide 1004 along angles that are less than a critical angle of LCD panel 1040, as measured with respect to a normal to a bottom surface of LCD panel 1040. Accordingly, the radiation can escape LCD panel 1040 without becoming trapped. In such implementations, a coupling layer such as, for example, a PET based diffuser, may still be placed in contact with LCD panel 1040 to supplement the light steering of hologram structure 1009.

In both examples illustrated in FIGS. 10A-10B, hologram structure 1009 can be bonded to LCD panel 1040 using optical adhesive. In addition to adhering LCD panel 1040 to hologram structure 1009, the presence of the optical adhesive can, in some instances, reduce reflections that would otherwise occur due to the refractive index mismatch (which may occur, for example, at an air gap at the interface between LCD panel 1040 and hologram structure 1009) and surface roughness at the surfaces of LCD panel 1040 and the hologram structure 1009. Similarly, hologram structure 1009 and/or LCD panel 1040 can be bonded to frustrating layer 1006, depending on the configuration employed. By reducing the amount of light reflected back toward a viewer, the image contrast provided by touch sensitive device can be improved. As an alternative to bonding hologram structure 1009 to LCD panel 1040, in some implementations, hologram structure 1009 may be formed as a separate layer that is not in optical and/or physical contact with the frustrating layer 1006 or the LCD panel 1040.

By dividing the thick hologram into a number of sub-holograms, each of which directs light of the desired wavelength into a different direction, it is possible to efficiently "position encode" the light impinging upon the frustrating layer according to its position at the point of incidence on the hologram. Thus, light incident from a given point of contact can be directed toward a camera or into a waveguide with a direction corresponding to the point of contact.

Figure 11:
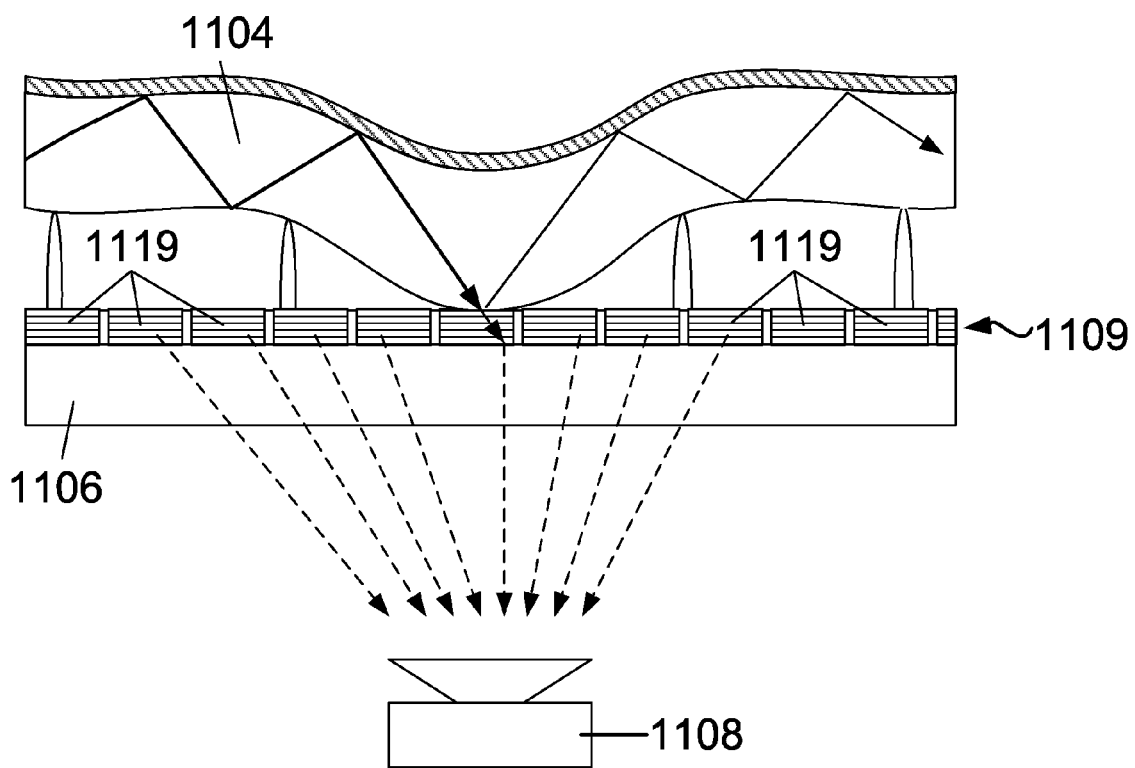

FIG. 11 is a schematic cross-sectional diagram of an example frustrating layer 1106 for incorporation within a touch sensitive device. As shown in the example, a thick hologram structure 1109 is positioned on a surface of frustrating layer 1106 and hologram structure 1109 is divided into multiple sub-holograms 1119. Each sub-hologram 1119 can steer incident radiation that escapes from waveguide 1104, due to FTIR, in a direction (indicated by dashed arrows) towards a center of the device where, for example, an imaging sensor 1108 may be located. Accordingly, each sub-hologram 1119 can be configured to a have a different respective angle of transmission for a particular wavelength of radiation incident on its surface.

As an alternative (or in addition) to forming hologram structure 1109 (including sub-holograms 1119) on the bottom surface of frustrating layer 1106, in some implementations, hologram structure 1109 (including sub-holograms 1119) may be formed on the bottom surface of an LCD layer (similarly to how light-steering layer 260 is formed on the bottom surface of LCD layer 240 in FIG. 2B) or on the bottom surface of a diffusive layer (e.g., light-steering layer 260 in FIG. 2B) that is adhered to the bottom surface of an LCD layer (e.g., LCD layer 240 in FIG. 2B).

In addition to, or as an alternative to, reflective layers and DOE structures, refractive optical elements (ROE) also may be employed as engineered microstructures on or within frustrating layer and/or light-steering layer to re-direct radiation that escapes from the waveguide when the frustrating layer contacts the waveguide. In general, ROE structures include a series of elements that are significantly larger than the wavelength(s) of incident radiation and direct radiation primarily by refraction. In some cases, the relatively small amount of diffraction that can occur in ROE structures may compensate for the dispersive properties of the material which forms the frustrating layer. Depending on the design and construction, an ROE structure can re-direct incident radiation in one or more directions.

Figure 12A:
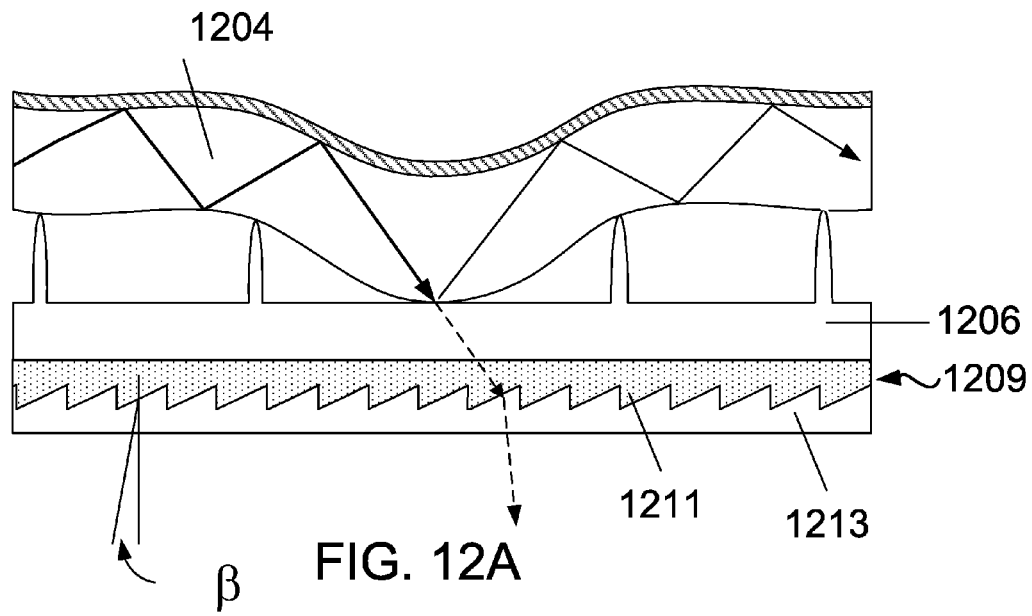

FIG. 12A is a schematic cross-sectional diagram of an example frustrating layer 1206 for frustrating TIR in a waveguide 1204. As shown in the example of FIG. 12A, an ROE structure 1209, such as, for example, a Fresnel prism array that includes individual Fresnel prism elements 1211 is formed on a surface of frustrating layer 1206. Fresnel prism elements 1211 are similar to the blazed grating structures illustrated in FIG. 7, except that elements 1211 are formed to have dimensions significantly greater than the wavelength of radiation for which re-direction is desired. For example, in the present implementation, the pitch between prism elements 1211 can be on the order of tens of microns to millimeters in size. The ridges of the Fresnel prism elements 1211 can form a triangle profile with an angle, $\beta$, that is a measure of the prism slope with respect to a normal to the plane on which the elements 1211 are formed. Changing $\beta$ can alter the direction of radiation refracted from the structure 1209 for a particular incident angle. Although the example of FIG. 12A illustrates a Fresnel prism structure having a blazed profile, other profiles including, but not limited to, sinusoidal or saw-tooth shapes, also can be implemented.

In some implementations, an encapsulant 1213 may fill the spacing between the Fresnel elements 1211 or other ROE structures. The encapsulant 1213 can be formed of transparent (or at least transmissive) materials including, for example, BPMA (p-bromophenacyl methacrylate), polycarbonate, polystyrene, silicones, as well as other resins. In certain implementations, the encapsulant material may be selected to have a high or low refractive index. In these implementations, the index of refraction may be sufficiently different from the ROE itself such that refraction can occur. Additionally or alternatively, in some implementations, a cladding layer (not shown) having approximately uniform thickness throughout may be disposed on a surface of the prism elements 1211 or on the encapsulant 1213. The cladding layer may be formed of a material that is transparent (or at least transmissive) to visible light emitted by the display source and can protect the Fresnel elements 1211 from damage.

As an alternative (or in addition) to forming ROE structure 1209 (e.g., Fresnel prism elements 1211) on the bottom surface of frustrating layer 1206 as illustrated in FIG. 12A, in some implementations, ROE structure 1209 (e.g., Fresnel prism elements 1211) may be formed on the bottom surface of an LCD layer (similarly to how light-steering layer 260 is formed on the bottom surface of LCD layer 240 in FIG. 2B) or on the bottom surface of a diffusive layer (e.g., light-steering layer 260 in FIG. 2B) that is adhered to the bottom surface of an LCD layer (e.g., LCD layer 240 in FIG. 2B).

Figure 12B:
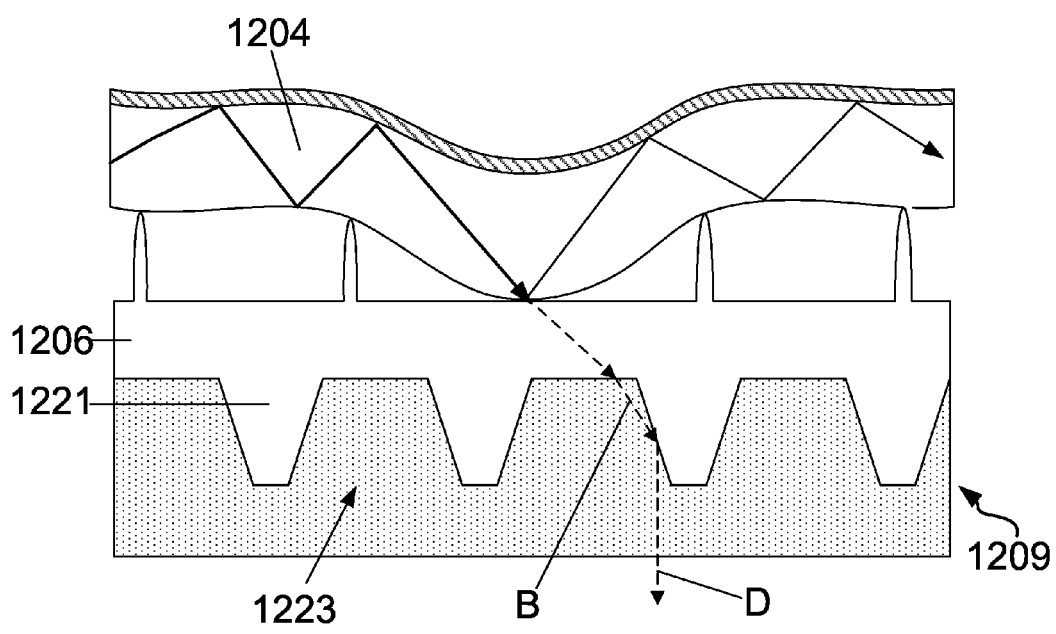

FIG. 12B illustrates a schematic cross-sectional diagram of an example frustrating layer 1206 that includes an ROE structure 1209, in which the ROE structure 1209 has a truncated pyramid profile. That is, ROE structure 1209 includes a series of truncated pyramid structures 1221 separated by gaps 1223. In the present implementation, air fills the gap regions, although gaps 1223 may be filled with other material having a refractive index lower than the material that forms pyramid structures 1221. Radiation (indicated by arrow "B") that escapes a waveguide 1204, due to FTIR, proceeds through frustrating layer 1206 and into the ROE structure 1209. In some cases, the ROE structure 1209 and frustrating layer 1206 have comparable refractive indices such that there is minimal refraction of the radiation as it passes into ROE structure 1209. The radiation then is incident on one of the sloped surfaces of pyramid structures 1221. Depending on the incident angle, the incident radiation can reflect one or more times off the surface of structure 1221 due to total internal reflection and return (as indicated by arrow "D") back toward the device.

As an alternative (or in addition) to forming ROE structure 1209 on the bottom surface of frustrating layer 1206 as illustrated in FIG. 12B, in some implementations, ROE structure 1209 may be formed on the bottom surface of an LCD layer (similarly to how light-steering layer 260 is formed on the bottom surface of LCD layer 240 in FIG. 2B) or on the bottom surface of a diffusive layer (e.g., light-steering layer 260 in FIG. 2B) that is adhered to the bottom surface of an LCD layer (e.g., LCD layer 240 in FIG. 2B).

ROE structures can be formed integrally with the frustrating layer (or LCD), i.e., as a single mass of seamless contiguous material or, alternatively, separate from the frustrating layer (or LCD layer). In some cases, ROE structures can be laminated to the frustrating layer (or LCD layer) or adhered to the frustrating layer using an adhesive. ROE structures can be formed using materials that include, but are not limited to acrylic, PET, PMMA, TPU or PC substrate. Examples of pre-fabricated ROE structures include VIKUITI™ Thin Brightness Enhancement Films (TBEF) and VIKUITI™ Transmissive Right Angle Films (TRAF), both of which can be purchased from 3M (St. Paul, Minn.).

In some implementations, a frustrating layer can be formed both above and beneath the pliable waveguide so that FTIR can be induced at a minimum of two separate regions on the pliable waveguide when an input applies pressure to the device. By increasing the number of regions along the waveguide where FTIR occurs, the amount of radiation that escapes can be increased. If the additional radiation is detected by an image sensor, the device sensitivity can be increased.

Figure 13:
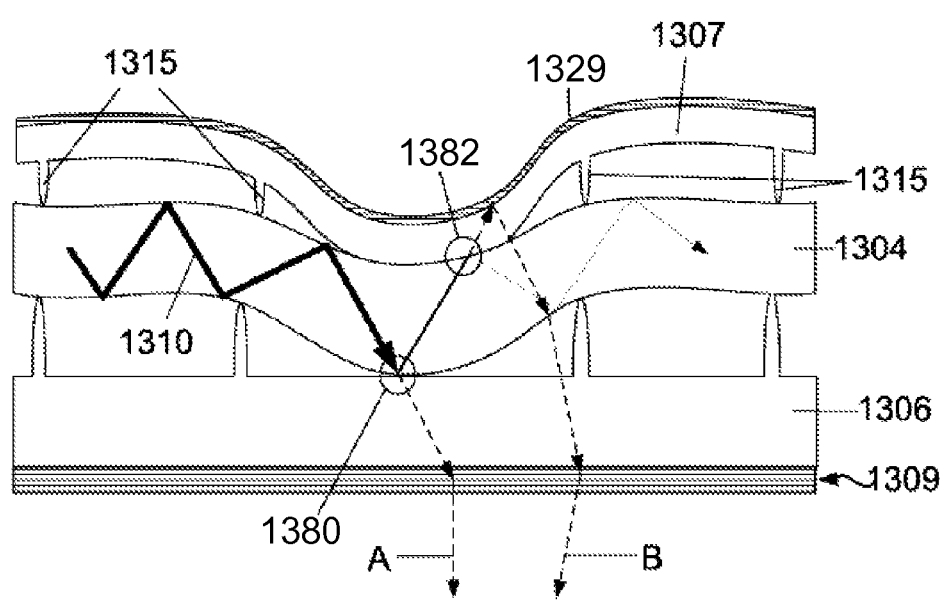

FIG. 13 is a schematic cross-sectional diagram of example frustrating layers 1306 and 1307 for incorporation within a touch sensitive device. Frustrating layer 1306 is positioned beneath waveguide 1304 whereas pliable frustrating layer 1307 is positioned above waveguide 1304.

In some implementations, protrusions 1315 may be formed on or as part of pliable frustrating layer 1307 to maintain a gap between the pliable waveguide 1304 and the pliable frustrating layer 1307. In such implementations, protrusions 1315 can be formed integrally with pliable frustrating layer 1304, i.e., protrusions 1315, together with pliable frustrating layer 1307, form a single mass of seamless, contiguous material. In some implementations, a micro-roughness layer having randomly (or semi-randomly) spaced protrusions may be formed on the surface of the pliable frustrating layer 1307, in which the micro-roughness functions substantially as protrusions 1315. In some cases, protrusions 1315 are formed from material distinct from pliable frustrating layer 1307 and/or pliable waveguide 1304. For example, glass spacers could be used to separate an acrylic waveguide from a polycarbonate frustrating layer. The spacing between protrusions 1315 can be random, pseudo-random or periodic.

When input pressure is applied by an object (not shown) to the device, the pliable frustrating layer 1307 is deformed such that it comes into contact with pliable waveguide 1304. In some cases, further application of pressure to the device will also cause waveguide 1304 to deform such that waveguide 1304 comes into contact with frustrating layer 1306 while maintaining contact with pliable frustrating layer 1307. As a result, at least two regions of contact may be made with the pliable waveguide 1304 that induce FTIR of radiation 1310 that travels through waveguide 1304.

At a first region of contact 1380, between waveguide 1304 and frustrating layer 1306, radiation 1310 escapes due to FTIR and travels in a direction toward frustrating layer 1306. At a second region of contact 1382, between waveguide 1304 and pliable frustrating layer 1307, radiation 1310 also escapes due to FTIR and travels in a direction toward pliable frustrating layer 1307. Both frustrating layer 1306 and frustrating layer 1307 can include a DOE structure and/or a ROE structure to re-direct the radiation towards an imaging sensor of the touch sensitive device. For example, frustrating layer 1306 includes a first thick hologram structure 1309 disposed on its bottom surface to re-direct radiation that escapes from the first region of contact 1380, in which the re-directed ray is indicated by arrow "A." Similarly, pliable frustrating layer 1307 includes a second thick hologram structure 1329 disposed on its top surface to re-direct radiation that escapes from the second region of contact 1382, in which the re-directed ray is indicated by arrow "B." Ray B then is re-directed again by first thick hologram structure 1309 after passing through waveguide 1304 and frustrating layer 1306. Because light that is redirected by thick hologram structure 1329 eventually may be redirected again by thick hologram structure 1309, thick hologram structure 1329 may be designed intentionally to account for any change in angle to light that it redirects (e.g., arrow "B" in FIG. 13) caused by thick hologram structure 1309. In some cases, the DOE and/or ROE structures can be designed to compensate for refraction and/or diffraction that may occur with other structures in the touch-sensitive device.

Although rays A and B, as shown in FIG. 13, are laterally separated due to the different positions along waveguide 1304 from which they escape, it is possible, in some implementations, to determine that the rays are a result of a single point of contact with the touch-sensitive device. For example, in some cases, the separation between rays A and B is small enough that both rays are incident on the same imaging sensor such that the two rays are indistinguishable to the imaging sensor. Alternatively, if the rays are incident on separate imaging sensors, a suitable computer (not shown) or other electronic device capable of handling image-processing operations can perform averaging algorithms to identify an averaged location between the separate rays that corresponds to the single point of contact.

As an alternative (or in addition) to forming DOE and/or ROE structure 1309 on the bottom surface of frustrating layer 1306 as illustrated in FIG. 13, in some implementations, ROE structure 1309 may be formed on the bottom surface of an LCD layer (similarly to how light-steering layer 260 is formed on the bottom surface of LCD layer 240 in FIG. 2B) or on the bottom surface of a diffusive layer (e.g., light-steering layer 260 in FIG. 2B) that is adhered to the bottom surface of an LCD layer (e.g., LCD layer 240 in FIG. 2B).

Figure 14:
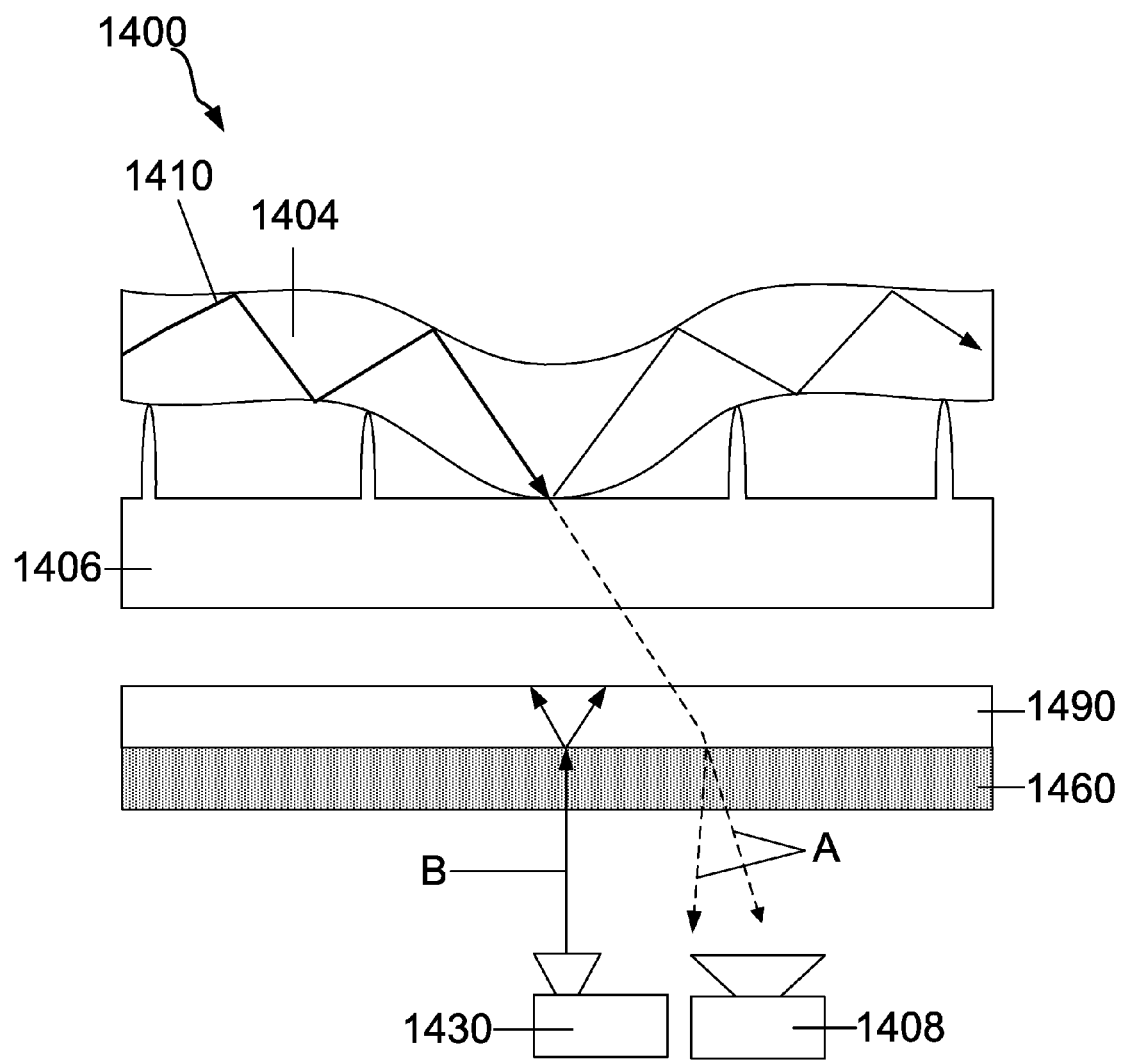
FIG. 14 is a schematic cross-sectional diagram of an example of a touch sensitive device.

As an alternative or in addition to the foregoing implementations, the touch sensitive device may include a screen projection layer onto which light from a display device is imaged. For example, FIG. 14 is a schematic cross-section diagram of a touch-sensitive device 1400 that includes a pliable waveguide layer 1404 through which radiation 1410 is traveling by TIR, a frustrating layer 1406, a display device 1430 and a screen projection layer 1490. Screen projection layer 1490 may include a diffuser layer (e.g., surface diffusing structures or volumetric diffusing structures), DOE structures or ROE structures (e.g., a fresnel lens). Screen projection layer 1490 may be formed of materials including, but not limited to glass, PMMA, PET, PC, PVC, TPU, or TAC. In some implementations, touch sensitive device 1400 also may include, but does not require, a light-steering layer 1460 adjacent to screen projection layer 1490 for steering or redirecting radiation that has escaped from pliable waveguide 1404 due to FTIR upon contact with frustrating layer 1406. Light-steering layer 1460 may include DOE structures or ROE structures (e.g., a fresnel lens). Light-steering layer 1460 may be formed of materials including, but not limited to glass, PMMA, PET, PC, PVC, TPU, or TAC. Both light-steering layer 1460 and screen projection layer 1490 may be films such as Alpha and Beta screens, which are commercially available from DNP Denmark AS.

As shown in the example of FIG. 14, visible light (indicated by arrow "B") emitted from display device 1430 (e.g., a projection source such as a video projector) is emitted towards a top surface of touch sensitive device 1400 (i.e., toward frustrating layer 1406 and pliable waveguide 1404) and is incident on light-steering layer 1460. Due to the diffusive properties of screen projection layer 1490, the visible light is diffused and imaged onto screen projection layer 1490 forming an image visible to a user viewing device 1400. In some cases, the light-steering structures, which are incorporated in light-steering layer 1460, may be configured to redirect radiation (e.g., IR radiation) that has escaped from waveguide 1404 due to FTIR upon contact with frustrating layer 1406. For example, as shown in FIG. 14, radiation (indicated by arrow "A") which escapes waveguide 1404 passes through screen projection layer 1490 and is incident on light-steering layer 1460. Light-steering layer 1460, which includes light-steering structures, then redirects the incident radiation toward one or more imaging sensors 1408.

Alternatively, light-steering layer 1460 may include two alternative types of light-steering structures: a first set of light-steering structures configured to diffuse visible light and a second set of light-steering structures configured to redirect the radiation which has escaped from waveguide 1404. In some implementations, light-steering layer 1460 does not include light-steering structures configured to redirect radiation that has escaped waveguide 1404. Instead, such light-steering structures may be formed on or within frustrating layer 1406.

Alternatively, in implementations in which light-steering layer 1460 is not included in the touch-sensitive device, light-steering structures employed on or within screen projection layer 1490 also may be configured to diffuse radiation (e.g., IR radiation) that has escaped from waveguide 1404 due to FTIR upon contact with frustrating layer 1406. For example, screen projection layer 1490 may include two alternative types of light-steering structures: a first set of light-steering structures configured to diffuse visible light and a second set of light-steering structures configured to redirect the radiation which has escaped from waveguide 1404.

In some implementations, screen projection layer 1490 and light-steering layer 1460 are bonded or laminated together. The bonding/lamination can be performed using an adhesive, such as an optical adhesive, to provide optical contact between screen projection layer 1490 and light-steering layer 1460. Alternatively, or in addition, screen projection layer 1490 may be bonded to frustrating layer 1406 using an adhesive such as, for example, an optical adhesive. In some cases, an air gap may be present between frustrating layer 1406 and screen projection layer 1490 and/or between screen projection layer 1490 and light-steering layer 1460.

A number of implementations have been described. Nevertheless, various modifications may be made. For example, although many of the implementations disclosed herein are described as employing LCD technology to generate output images, OLED or LED technology could be substituted for the LCD technology employed in each of these disclosed implementations to generate the output images. OLEDs and LEDs both generally are emissive elements. Therefore, in implementations that employ OLED or LED technology to generate output images, there may be no need for a backlight. Accordingly, other implementations are within the scope of the following claims.

What is claimed is:

1. A touch-screen device comprising:
a radiation source;
a pliable waveguide configured to receive radiation emitted by the radiation source and to cause at least some of the received radiation to undergo total internal reflection within the pliable waveguide;
a frustrating layer disposed relative to the pliable waveguide such that a small gap exists between the frustrating layer and the pliable waveguide so as to enable the frustrating layer to contact the pliable waveguide when the pliable waveguide is physically deformed, the frustrating layer being configured to:
cause frustration of the total internal reflection of the received radiation within the pliable waveguide at a contact point between the frustrating layer and the pliable waveguide when the pliable waveguide is physically deformed to contact the frustrating layer such that some of the received radiation undergoing total internal reflection within the pliable waveguide escapes via frustrated total internal reflection from the pliable waveguide at the contact point and proceeds through the frustrating layer;
a display device fixed to a bottom surface of the frustrating layer comprising:
an imaging sensor embedded in the display device, the imaging sensor configured to detect at least some of the radiation that escapes from the pliable waveguide and proceeds through the frustrating layer; and
a structure configured to steer at least a portion of the radiation that escapes from the pliable waveguide toward the imaging sensor and proceeds through the frustrating layer;
a coupling layer in contact with a side of the display device, the side being furthest from the frustrating layer, and wherein the coupling layer is configured to couple radiation out of the display device; and a cladding layer positioned on a surface of the pliable waveguide;

wherein the frustrating layer is in optical contact with the display device; and wherein portions of the cladding layer are located within one or more grooves defined by the structure.

2. The touch-screen device of claim 1 wherein the structure comprises a light diffusing surface.

3. The touch-screen device of claim 1 wherein the structure comprises a volume diffusing structure integral to the frustrating layer.

4. The touch-screen device of claim 1 wherein the structure comprises a diffraction pattern corresponding to a grating structure.

5. The touch-screen device of claim 4 wherein the grating structure includes at least one of a blazed grating profile, a square-wave profile, a 1-bit binary diffraction grating profile, a multiple-bit modulated binary profile, a sinusoidal profile and a half-sinusoidal profile.

6. The touch-screen device of claim 1 wherein the structure comprises an aperiodic diffraction pattern.

7. The touch-screen device of claim 1 wherein the structure comprises a diffraction pattern in which planes of refractive index variation are aligned substantially parallel with a surface of the frustrating layer on which the radiation is incident.

8. The touch-screen device of claim 1 wherein the structure is on a surface of the frustrating layer that is nearest to the pliable waveguide.

9. The touch-screen device of claim 1 wherein the structure is on a surface of the frustrating layer that is furthest from the pliable waveguide.

10. The touch-screen device of claim 1 wherein the structure is configured to steer by diffraction at least a portion of the radiation that escapes from the pliable waveguide toward the imaging sensor.

11. The touch-screen device of claim 1 wherein the structure is configured to steer by refraction at least a portion of the radiation that escapes from the pliable waveguide toward the imaging sensor.

12. The touch-screen device of claim 11 wherein the structure comprises an array of prisms.

13. The touch-screen device of claim 1 wherein the structure is divided into sub-structures and each sub-structure is configured to steer radiation that escapes from the pliable waveguide toward the imaging sensor.

14. The touch-screen device of claim 1 further comprising a pliable frustrating layer disposed relative to the pliable waveguide so as to enable the pliable frustrating layer to contact the pliable waveguide when the pliable frustrating layer is physically deformed, the pliable frustrating layer being configured to:

cause frustration of the total internal reflection of the received radiation within the pliable waveguide at a contact point between the pliable frustrating layer and the pliable waveguide when the pliable frustrating layer is physically deformed to contact the pliable waveguide such that some of the received radiation undergoing total internal reflection within the pliable waveguide escapes from the pliable waveguide at the contact point between the pliable frustrating layer and the pliable waveguide.

15. The touch-screen device of claim 14 wherein the frustrating layer is disposed on a first side of the pliable waveguide and the pliable frustrating layer is disposed on a second opposite side of the pliable waveguide.

16. The touch-screen device of claim 14 wherein the pliable frustrating layer comprises a structure configured to steer at least a portion of the radiation that escapes from the pliable waveguide toward the imaging sensor.

17. The touch-screen device of claim 1 wherein the frustrating layer is fixed to the display device.

18. The touch-screen device of claim 1 wherein the coupling layer is in optical contact with the side of the display device that is furthest from the frustrating layer.

19. The touch-screen device of claim 1 wherein the display device is a liquid crystal device.

20. The touch-screen device of claim 1 wherein the display device is an organic light emitting diode (OLED) device.

21. The touch-screen device of claim 1 wherein the structure comprises a polarizer or substrate of the display device.

22. The touch-screen device of claim 1 wherein the structure comprises a light diffusing structure.

23. The touch-screen device of claim 22 wherein the light diffusing structure comprises a volumetric diffusive layer.

24. The touch-screen device of claim 23 wherein the light diffusing structure comprises a surface diffusive layer.

25. The touch-screen device of claim 1 further comprising a screen projection layer adjacent to the frustrating layer.

26. The touch-screen device of claim 1 wherein the frustrating layer comprises a screen projection layer.

27. The touch-screen device of claim 1 further comprising a cladding layer on the structure.

28. A touch-screen device comprising:

a radiation source;

a pliable waveguide configured to receive radiation emitted by the radiation source and to cause at least some of the received radiation to undergo total internal reflection within the pliable waveguide;

a frustrating layer disposed relative to the pliable waveguide such that a small gap exists between the frustrating layer and the pliable waveguide so as to enable a top surface of the frustrating layer to contact the pliable waveguide when the pliable waveguide is physically deformed, the frustrating layer being configured to:

cause frustration of the total internal reflection of the received radiation within the pliable waveguide at a contact point between the top surface of the frustrating layer and the pliable waveguide when the pliable waveguide is physically deformed to contact the top surface of the frustrating layer such that some of the received radiation undergoing total internal reflection within the pliable waveguide escapes via frustrated total internal reflection from the pliable waveguide at the contact point and proceeds through the frustrating layer;

an image generating layer fixed to a bottom surface of the frustrating layer that is opposite to the top surface of the frustrating layer, the image generating layer having a top surface facing the bottom surface of the frustrating layer and a bottom surface that is opposite from the top surface of the image generating layer and the image generating layer being configured to emit output images towards the frustrating layer and the pliable waveguide and to be transmissive to radiation emitted by the radiation source;

an imaging sensor embedded in the image generating layer and configured to detect at least some of the radiation that escapes from the pliable waveguide and proceeds through the frustrating layer;

a light-steering structure disposed adjacent to the bottom surface of the image generating layer, the light-steering structure being configured to steer at least a portion of the radiation that escapes from the pliable waveguide and proceeds through the frustrating layer toward the imaging sensor;

a coupling layer in contact with a side of the image generating layer, the side being furthest from the frustrating layer, and wherein the coupling layer is configured to couple radiation out of the image generating layer; and a cladding layer positioned on a surface of the pliable waveguide;

wherein the frustrating layer is in optical contact with the image generating layer; and wherein portions of the cladding layer are located within one or more grooves defined by the light-steering structure.

29. The touch-screen device of claim 28 wherein the light-steering structure is in optical contact with the bottom surface of the image generating layer.

30. The touch-screen device of claim 28 wherein the light-steering structure is fixed to the bottom surface of the image generating layer.

31. The touch-screen device of claim 28 wherein the top surface of the image generating layer is in optical contact with the bottom surface of the frustrating layer.

32. The touch-screen device of claim 28 wherein the top surface of the image generating layer is fixed to the bottom surface of the frustrating layer.

33. The touch-screen device of claim 28 wherein the image generating layer comprises a liquid crystal device.

34. The touch-screen device of claim 28 wherein the image generating layer comprises a light emitting diode device.

35. The touch-screen device of claim 34 wherein the light emitting diode device comprises an organic light emitting diode device.

36. The touch-screen device of claim 28 wherein the light-steering structure comprises a light diffusing structure.

37. The touch-screen device of claim 36 wherein the light diffusing structure comprises a surface diffusive layer.

38. The touch-screen device of claim 36 wherein the light diffusing structure comprises a volumetric diffusive layer.

39. The touch-screen device of claim 28 wherein the light-steering structure comprises a diffraction pattern corresponding to a grating structure.

40. The touch-screen device of claim 28 wherein the light-steering structure comprises an aperiodic diffraction pattern.

41. The touch-screen device of claim 28 wherein the light-steering structure comprises a diffraction pattern in which planes of refractive index variation are aligned substantially parallel with a surface of the frustrating layer on which the radiation is incident.

42. The touch-screen device of claim 28 wherein the light-steering structure is configured to steer by diffraction at least a portion of the radiation that escapes from the pliable waveguide toward the imaging sensor.

43. The touch-screen device of claim 28 wherein the light-steering structure is configured to steer by refraction at least a portion of the radiation that escapes from the pliable waveguide toward the imaging sensor.

44. The touch-screen device of claim 28 further comprising a cladding layer on a surface of the light-steering structure.

45. The touch-screen device of claim 28 further comprising a plurality of imaging sensors, each imaging sensor being configured to detect at least some of the radiation that escapes from the pliable waveguide.

* * * * *